(12) United States Patent
Economaki

(10) Patent No.: US 6,766,583 B2
(45) Date of Patent: Jul. 27, 2004

(54) TOOL TO MEASURE AND SET ANGLES USING CALIPERS OR OTHER LINEAR MEASURING DEVICES

(76) Inventor: John Economaki, 820 Timberline Dr., Lake Oswego, OR (US) 97034

( * ) Notice: Subject to any disclaimer, the term of this patent is extended or adjusted under 35 U.S.C. 154(b) by 0 days.

(21) Appl. No.: 10/240,881
(22) PCT Filed: Jul. 16, 2001
(86) PCT No.: PCT/US01/22280
  § 371 (c)(1),
  (2), (4) Date: Oct. 4, 2002
(87) PCT Pub. No.: WO02/44648
  PCT Pub. Date: Jun. 6, 2002

(65) Prior Publication Data
US 2003/0051361 A1 Mar. 20, 2003

Related U.S. Application Data
(60) Provisional application No. 60/250,314, filed on Nov. 30, 2000.

(51) Int. Cl.⁷ .................................................. G01B 5/24
(52) U.S. Cl. ............................ 33/534; 33/538; 33/807
(58) Field of Search ........................... 33/534, 535, 536, 33/537, 538, 532, 806, 807, 808, 796

(56) References Cited

U.S. PATENT DOCUMENTS

| | | | | | |
|---|---|---|---|---|---|
| 672,213 | A | * | 4/1901 | Holcomb | 33/534 |
| 2,645,026 | A | * | 7/1953 | Trbojevich | 33/536 |
| 2,830,374 | A | * | 4/1958 | Aivaz | 33/534 |
| 2,959,861 | A | * | 11/1960 | Stromquist | 33/534 |
| 3,670,418 | A | * | 6/1972 | Hamilton, Jr. | 33/534 |
| 4,201,226 | A | * | 5/1980 | Phillips | 33/512 |
| 4,731,931 | A | * | 3/1988 | Goodman et al. | 33/796 |
| 4,897,931 | A | * | 2/1990 | Goulette | 33/534 |
| 5,056,238 | A | * | 10/1991 | Chi | 33/532 |
| 5,084,982 | A | | 2/1992 | Feng | |
| 5,133,135 | A | * | 7/1992 | Durfee, Jr. | 33/534 |
| 5,188,121 | A | | 2/1993 | Hanson | |
| 5,207,007 | A | * | 5/1993 | Cucinotta et al. | 33/534 |
| 6,105,269 | A | | 8/2000 | Kondrat | |
| 6,148,531 | A | | 11/2000 | Economaki | |
| 6,334,257 | B1 | * | 1/2002 | Den Ouden | 33/1 N |
| 6,536,124 | B1 | * | 3/2003 | Eskew et al. | 33/538 |
| 6,574,582 | B1 | * | 6/2003 | Geiger | 33/1 L |

FOREIGN PATENT DOCUMENTS

| | | |
|---|---|---|
| EP | 0 198 108 A2 | 10/1986 |
| EP | 0 485 048 A2 | 5/1992 |
| WO | WO 02/44648 A1 | 6/2002 |

OTHER PUBLICATIONS

International Search Report in related PCT/US01/22280.

* cited by examiner

*Primary Examiner*—Christopher W. Fulton
*Assistant Examiner*—Amanda J Hoolahan
(74) *Attorney, Agent, or Firm*—McKee, Voorhees & Sease, P.L.C.

(57) ABSTRACT

This invention provides an angle gauge that, when used in conjunction with a caliper or other linear measuring device, improves both the precision and ease with which angles can be measured and set by allowing the user accurately to measure and set angles in fractions of degrees. Using the gauge, an angle formed by the gauge may be determined or set by reference to the linear distance measured by the caliper. Calculations or tables can be used to convert the linear measurements into the angle setting or measurement with great accuracy, or the capacity to calculate the angle corresponding to the linear measurement can be built (i.e. programmed) directly into the device.

20 Claims, 25 Drawing Sheets

| TABLE 1 | | | | | | | |
|---|---|---|---|---|---|---|---|
| Distance D | Primary Angle A | | | | Supplementary Angle S | | |
| Millimeters | Degrees | Deg. | Min. | Sec. | Degrees | Deg. | Min. | Sec. |
| 0.00 | 90.000 | 90 | 0 | 0 | 90.000 | 0 | 0 | 0 |
| 0.01 | 90.004 | 90 | 0 | 15 | 89.996 | 89 | 59 | 44 |
| 0.02 | 90.009 | 90 | 0 | 31 | 89.991 | 89 | 59 | 28 |
| 0.03 | 90.013 | 90 | 0 | 47 | 89.987 | 89 | 59 | 12 |
| 0.04 | 90.018 | 90 | 1 | 3 | 89.982 | 89 | 58 | 56 |
| 0.05 | 90.022 | 90 | 1 | 19 | 89.978 | 89 | 58 | 40 |
| 0.06 | 90.026 | 90 | 1 | 35 | 89.974 | 89 | 58 | 24 |
| 0.07 | 90.031 | 90 | 1 | 51 | 89.969 | 89 | 58 | 8 |
| 0.08 | 90.035 | 90 | 2 | 6 | 89.965 | 89 | 57 | 53 |
| 0.09 | 90.040 | 90 | 2 | 22 | 89.960 | 89 | 57 | 37 |
| 0.10 | 90.044 | 90 | 2 | 38 | 89.956 | 89 | 57 | 21 |
| 0.11 | 90.048 | 90 | 2 | 54 | 89.952 | 89 | 57 | 5 |
| 0.12 | 90.053 | 90 | 3 | 10 | 89.947 | 89 | 56 | 49 |
| 0.13 | 90.057 | 90 | 3 | 26 | 89.943 | 89 | 56 | 33 |
| 0.14 | 90.062 | 90 | 3 | 42 | 89.938 | 89 | 56 | 17 |
| 0.15 | 90.066 | 90 | 3 | 57 | 89.934 | 89 | 56 | 2 |
| 0.16 | 90.070 | 90 | 4 | 13 | 89.930 | 89 | 55 | 46 |
| 0.17 | 90.075 | 90 | 4 | 29 | 89.925 | 89 | 55 | 30 |
| 0.18 | 90.079 | 90 | 4 | 45 | 89.921 | 89 | 55 | 14 |
| 0.19 | 90.084 | 90 | 5 | 1 | 89.916 | 89 | 54 | 58 |
| 0.20 | 90.088 | 90 | 5 | 17 | 89.912 | 89 | 54 | 42 |
| 0.21 | 90.093 | 90 | 5 | 33 | 89.907 | 89 | 54 | 26 |
| 0.22 | 90.097 | 90 | 5 | 48 | 89.903 | 89 | 54 | 11 |
| 0.23 | 90.101 | 90 | 6 | 4 | 89.899 | 89 | 53 | 55 |
| 0.24 | 90.106 | 90 | 6 | 20 | 89.894 | 89 | 53 | 39 |
| 0.25 | 90.110 | 90 | 6 | 36 | 89.890 | 89 | 53 | 23 |
| 0.26 | 90.115 | 90 | 6 | 52 | 89.885 | 89 | 53 | 7 |
| 0.27 | 90.119 | 90 | 7 | 8 | 89.881 | 89 | 52 | 51 |
| 0.28 | 90.123 | 90 | 7 | 24 | 89.877 | 89 | 52 | 35 |
| 0.29 | 90.128 | 90 | 7 | 39 | 89.872 | 89 | 52 | 20 |
| 0.30 | 90.132 | 90 | 7 | 55 | 89.868 | 89 | 52 | 4 |
| 0.31 | 90.137 | 90 | 8 | 11 | 89.863 | 89 | 51 | 48 |
| 0.32 | 90.141 | 90 | 8 | 27 | 89.859 | 89 | 51 | 32 |
| 0.33 | 90.145 | 90 | 8 | 43 | 89.855 | 89 | 51 | 16 |
| 0.34 | 90.150 | 90 | 8 | 59 | 89.850 | 89 | 51 | 0 |
| 0.35 | 90.154 | 90 | 9 | 15 | 89.846 | 89 | 50 | 44 |
| 0.36 | 90.159 | 90 | 9 | 31 | 89.841 | 89 | 50 | 29 |
| 0.37 | 90.163 | 90 | 9 | 46 | 89.837 | 89 | 50 | 13 |
| 0.38 | 90.167 | 90 | 10 | 2 | 89.833 | 89 | 49 | 57 |
| 0.39 | 90.172 | 90 | 10 | 18 | 89.828 | 89 | 49 | 41 |
| 0.40 | 90.176 | 90 | 10 | 34 | 89.824 | 89 | 49 | 25 |

FIG. 13

| TABLE 2 |||||
|---|---|---|---|---|
| Distance D | Angle X ||||
| Millimeters | Degrees | Deg. | Min. | Sec. |
| 0.00 | 180.000 | 180 | 0 | 0 |
| 0.01 | 179.996 | 179 | 59 | 44 |
| 0.02 | 179.991 | 179 | 59 | 28 |
| 0.03 | 179.987 | 179 | 59 | 12 |
| 0.04 | 179.982 | 179 | 58 | 56 |
| 0.05 | 179.978 | 179 | 58 | 40 |
| 0.06 | 179.974 | 179 | 58 | 24 |
| 0.07 | 179.969 | 179 | 58 | 8 |
| 0.08 | 179.965 | 179 | 57 | 53 |
| 0.09 | 179.960 | 179 | 57 | 37 |
| 0.10 | 179.956 | 179 | 57 | 21 |
| 0.11 | 179.952 | 179 | 57 | 5 |
| 0.12 | 179.947 | 179 | 56 | 49 |
| 0.13 | 179.943 | 179 | 56 | 33 |
| 0.14 | 179.938 | 179 | 56 | 17 |
| 0.15 | 179.934 | 179 | 56 | 2 |
| 0.16 | 179.930 | 179 | 55 | 46 |
| 0.17 | 179.925 | 179 | 55 | 30 |
| 0.18 | 179.921 | 179 | 55 | 14 |
| 0.19 | 179.916 | 179 | 54 | 58 |
| 0.20 | 179.912 | 179 | 54 | 42 |
| 0.21 | 179.907 | 179 | 54 | 26 |
| 0.22 | 179.903 | 179 | 54 | 11 |
| 0.23 | 179.899 | 179 | 53 | 55 |
| 0.24 | 179.894 | 179 | 53 | 39 |
| 0.25 | 179.890 | 179 | 53 | 23 |
| 0.26 | 179.885 | 179 | 53 | 7 |
| 0.27 | 179.881 | 179 | 52 | 51 |
| 0.28 | 179.877 | 179 | 52 | 35 |
| 0.29 | 179.872 | 179 | 52 | 20 |
| 0.30 | 179.868 | 179 | 52 | 4 |
| 0.31 | 179.863 | 179 | 51 | 48 |
| 0.32 | 179.859 | 179 | 51 | 32 |
| 0.33 | 179.855 | 179 | 51 | 16 |
| 0.34 | 179.850 | 179 | 51 | 0 |
| 0.35 | 179.846 | 179 | 50 | 44 |
| 0.36 | 179.841 | 179 | 50 | 28 |
| 0.37 | 179.837 | 179 | 50 | 13 |
| 0.38 | 179.833 | 179 | 49 | 57 |
| 0.39 | 179.828 | 179 | 49 | 41 |
| 0.40 | 179.824 | 179 | 49 | 25 |

FIG. 14

| TABLE 3 | | | | |
|---|---|---|---|---|
| Distance D | Angle Y | | | |
| Millimeters | Degrees | Deg. | Min. | Sec. |
| 0.00 | 90.000 | 90 | 0 | 0 |
| 0.01 | 89.996 | 89 | 59 | 44 |
| 0.02 | 89.987 | 89 | 59 | 12 |
| 0.03 | 89.974 | 89 | 58 | 24 |
| 0.04 | 89.956 | 89 | 57 | 21 |
| 0.05 | 89.934 | 89 | 56 | 2 |
| 0.06 | 89.908 | 89 | 54 | 27 |
| 0.07 | 89.877 | 89 | 52 | 35 |
| 0.08 | 89.841 | 89 | 50 | 29 |
| 0.09 | 89.802 | 89 | 48 | 6 |
| 0.10 | 89.758 | 89 | 45 | 27 |
| 0.11 | 89.709 | 89 | 42 | 33 |
| 0.12 | 89.656 | 89 | 39 | 23 |
| 0.13 | 89.599 | 89 | 35 | 56 |
| 0.14 | 89.537 | 89 | 32 | 14 |
| 0.15 | 89.471 | 89 | 28 | 17 |
| 0.16 | 89.401 | 89 | 24 | 3 |
| 0.17 | 89.326 | 89 | 19 | 33 |
| 0.18 | 89.247 | 89 | 14 | 48 |
| 0.19 | 89.163 | 89 | 9 | 46 |
| 0.20 | 89.075 | 89 | 4 | 29 |
| 0.21 | 88.982 | 88 | 58 | 56 |
| 0.22 | 88.886 | 88 | 53 | 7 |
| 0.23 | 88.784 | 88 | 47 | 3 |
| 0.24 | 88.678 | 88 | 40 | 42 |
| 0.25 | 88.568 | 88 | 34 | 5 |
| 0.26 | 88.454 | 88 | 27 | 13 |
| 0.27 | 88.335 | 88 | 20 | 5 |
| 0.28 | 88.211 | 88 | 12 | 41 |
| 0.29 | 88.084 | 88 | 5 | 1 |
| 0.30 | 87.952 | 87 | 57 | 5 |
| 0.31 | 87.815 | 87 | 48 | 53 |
| 0.32 | 87.674 | 87 | 40 | 26 |
| 0.33 | 87.529 | 87 | 31 | 42 |
| 0.34 | 87.379 | 87 | 22 | 43 |
| 0.35 | 87.225 | 87 | 13 | 28 |

FIG. 15

| TABLE 4 | | | | | | | |
|---|---|---|---|---|---|---|---|
| Distance D | Large Protractor Angle C | | | | Small Protractor Angle B | | |
| Millimeters | Degrees | Deg. | Min. | Sec. | Degrees | Deg. | Min. | Sec. |
| 0.00 | 0.000 | 0 | 0 | 0 | 90.000 | 90 | 0 | 0 |
| 0.01 | 0.004 | 0 | 0 | 15 | 89.996 | 89 | 59 | 44 |
| 0.02 | 0.013 | 0 | 0 | 47 | 89.987 | 89 | 59 | 12 |
| 0.03 | 0.026 | 0 | 1 | 35 | 89.974 | 89 | 58 | 24 |
| 0.04 | 0.044 | 0 | 2 | 38 | 89.956 | 89 | 57 | 21 |
| 0.05 | 0.066 | 0 | 3 | 57 | 89.934 | 89 | 56 | 2 |
| 0.06 | 0.092 | 0 | 5 | 32 | 89.908 | 89 | 54 | 27 |
| 0.07 | 0.123 | 0 | 7 | 24 | 89.877 | 89 | 52 | 35 |
| 0.08 | 0.159 | 0 | 9 | 30 | 89.841 | 89 | 50 | 29 |
| 0.09 | 0.198 | 0 | 11 | 53 | 89.802 | 89 | 48 | 6 |
| 0.10 | 0.242 | 0 | 14 | 32 | 89.758 | 89 | 45 | 27 |
| 0.11 | 0.291 | 0 | 17 | 26 | 89.709 | 89 | 42 | 33 |
| 0.12 | 0.344 | 0 | 20 | 36 | 89.656 | 89 | 39 | 23 |
| 0.13 | 0.401 | 0 | 24 | 3 | 89.599 | 89 | 35 | 56 |
| 0.14 | 0.463 | 0 | 27 | 45 | 89.537 | 89 | 32 | 14 |
| 0.15 | 0.529 | 0 | 31 | 42 | 89.471 | 89 | 28 | 17 |
| 0.16 | 0.599 | 0 | 35 | 56 | 89.401 | 89 | 24 | 3 |
| 0.17 | 0.674 | 0 | 40 | 26 | 89.326 | 89 | 19 | 33 |
| 0.18 | 0.753 | 0 | 45 | 11 | 89.247 | 89 | 14 | 48 |
| 0.19 | 0.837 | 0 | 50 | 13 | 89.163 | 89 | 9 | 46 |
| 0.20 | 0.925 | 0 | 55 | 30 | 89.075 | 89 | 4 | 29 |
| 0.21 | 1.018 | 1 | 1 | 3 | 88.982 | 88 | 58 | 56 |
| 0.22 | 1.114 | 1 | 6 | 52 | 88.886 | 88 | 53 | 7 |
| 0.23 | 1.216 | 1 | 12 | 56 | 88.784 | 88 | 47 | 3 |
| 0.24 | 1.322 | 1 | 19 | 17 | 88.678 | 88 | 40 | 42 |
| 0.25 | 1.432 | 1 | 25 | 54 | 88.568 | 88 | 34 | 5 |
| 0.26 | 1.546 | 1 | 32 | 46 | 88.454 | 88 | 27 | 13 |
| 0.27 | 1.665 | 1 | 39 | 54 | 88.335 | 88 | 20 | 5 |
| 0.28 | 1.789 | 1 | 47 | 18 | 88.211 | 88 | 12 | 41 |
| 0.29 | 1.916 | 1 | 54 | 58 | 88.084 | 88 | 5 | 1 |
| 0.30 | 2.048 | 2 | 2 | 54 | 87.952 | 87 | 57 | 5 |
| 0.31 | 2.185 | 2 | 11 | 6 | 87.815 | 87 | 48 | 53 |
| 0.32 | 2.326 | 2 | 19 | 33 | 87.674 | 87 | 40 | 26 |
| 0.33 | 2.471 | 2 | 28 | 17 | 87.529 | 87 | 31 | 42 |
| 0.34 | 2.621 | 2 | 37 | 16 | 87.379 | 87 | 22 | 43 |
| 0.35 | 2.775 | 2 | 46 | 31 | 87.225 | 87 | 13 | 28 |

FIG. 25

TOOL TO MEASURE AND SET ANGLES USING CALIPERS OR OTHER LINEAR MEASURING DEVICES

CROSS-REFERENCE TO RELATED APPLICATIONS

This application claims priority to International Application No. PCT/US01/22280 filed in the U.S. Receiving Office on Jul. 16, 2001 and published in English as International Publication No. WO 02/44648 A1 on Jun. 6, 2002 which claims priority to U.S. Provisional Application No. 60/250,314 filed on Nov. 30, 2000, the entire contents of which are incorporated herein by reference.

BACKGROUND

In various manufacturing and technical assembly applications, such as woodworking and metalworking, it is important to accurately set and measure angles to ensure the components of a workpiece, jig or machine are precisely oriented relative to each other. Currently, the setting and measurement of angles relies primarily upon various protractor devices or sine bars. But protractor devices, such as the ruler and protractor head of a combination square, lend themselves to less than precise angular measurements. Such inaccuracy is caused both by the design of the devices and by operator error. Positioning the protractor to reflect the correct angle can be difficult, especially to the unskilled operator. Even if properly positioned, many protractors are able to measure, at best, one-degree increments. Therefore, an angle setting or measurement read from a protractor is frequently accurate only to the nearest degree. Smaller, fractional increments are not available. Additionally, differentiating between the one-degree increments when the protractor is in use can be difficult, oftentimes leading to inaccurate readings by the user.

While sine bars are more precise, they are more expensive, complex to use, and require a strong understanding of trigonometry, and thus their enhanced precision can be compromised by user error as well. Therefore, a need exists to provide a device that both enhances the precision of angle measurements and settings and simplifies the process. Another usable device is described in U.S. Pat. No. 6,148,531, which converts linear measurements into angular settings. While versatile, this prior device can be difficult to use with desired accuracy in certain situations and requires manipulation and manual alignment of at least two different assemblies during use rather than one unified assembly.

SUMMARY OF THE INVENTION

This invention provides an angle gauge that, when used in conjunction with a caliper or other linear measuring device, improves both the precision and ease with which angles can be measured and set by allowing the user to accurately measure and set angles in fractions of degrees. Using the gauge, an angle formed by the gauge may be determined or set by reference to the linear distance measured by the caliper. Calculations or tables can be used to convert the linear measurements into the angle setting or measurement with great accuracy, or the capacity to calculate the angle corresponding to the linear measurement can be built (i.e. programmed) directly into the device.

The gauge is first mounted on the arms of a caliper. To set a particular angle, the user locates on the table the distance between the caliper arms that corresponds to the desired angle and sets and locks the caliper arms at that distance, which automatically positions the arms or wings of the gauge at the desired angle. Similarly, to measure an angle between two reference structures, the user positions the gauge wings in contact with the reference structures, notes the distance on the caliper when the gauge is so positioned, and consults the table to locate the angle measurement corresponding to that distance. Auxiliary arms may be added to the gauge to provide additional ranges of angles for measurement and setting.

In the angle gauge of this invention, two reference wings are pivotably joined to move through 90 degrees of movement relative to each other while each wing is coupled to a caliper arm and the caliper arms move between a fully closed and an open position. An auxiliary right angle attachment arm may be attached to each wing, in effect adding or subtracting 90 degrees from the angular relationship between the wings.

It is an object of the present invention to improve the precision and ease with which angles can be measured and set.

It is another object of the present invention to provide a system that converts a linear distance into angular measurements.

BRIEF DESCRIPTION OF THE DRAWINGS

FIG. 13 is a table showing corresponding linear and angular measurements for use with the embodiment of FIGS. 1–7.

FIG. 14 is a table showing corresponding linear and angular measurements for use with the embodiment of FIGS. 9–10 having one right angle attachment.

FIG. 15 is a table showing corresponding linear and angular measurements for use with the embodiment of FIGS. 11–12 having two right angle attachments.

FIG. 25 is a table showing corresponding linear and angular measurements for use with the embodiment of FIGS. 16–24.

DETAILED DESCRIPTION OF THE DRAWINGS

The angle gauge of this invention measures and sets angles with enhanced accuracy using a linear measuring device, such as a conventional digital read-out or dial read-out caliper. While, for purposes of discussion, the device is shown in use with a digital caliper, it may be used with any appropriate linear measuring device.

Figure 1:
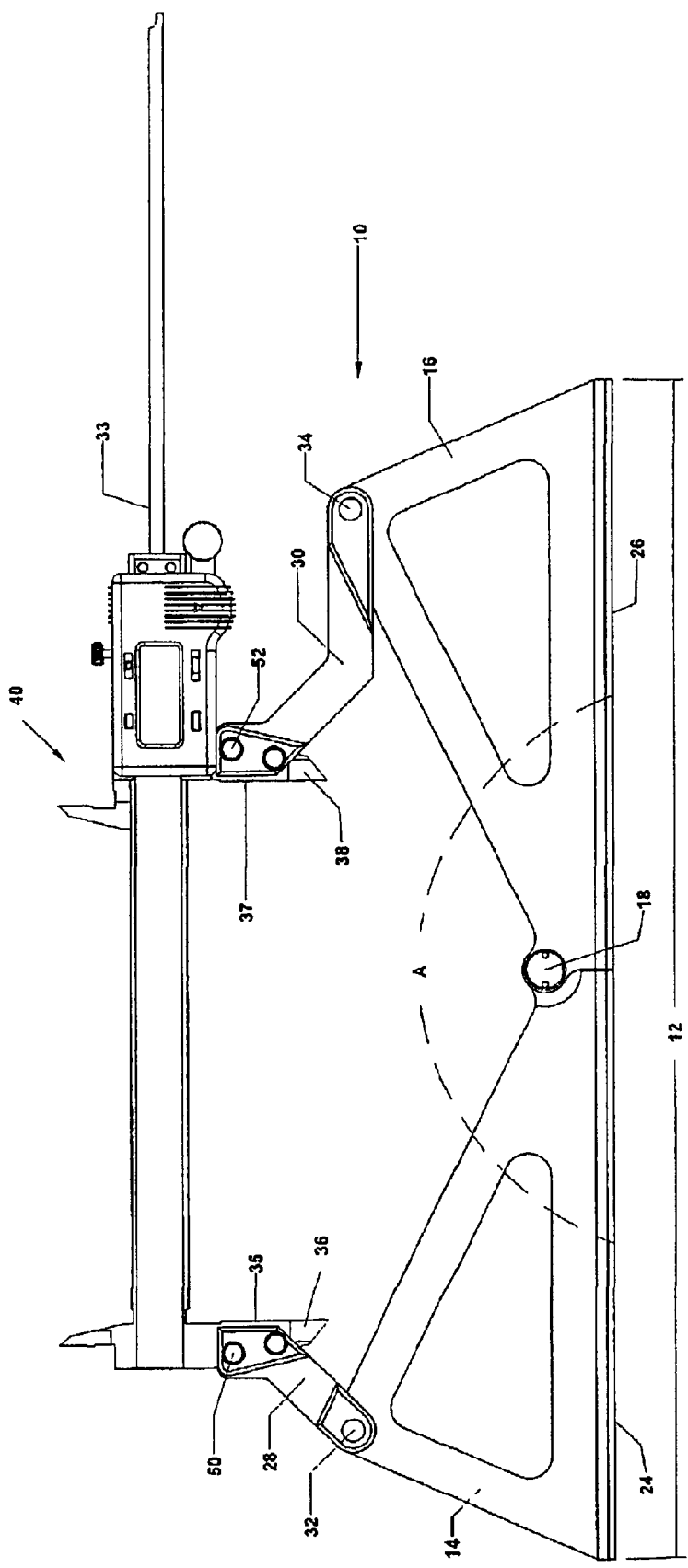
FIG. 1 is a top plan view of one embodiment of the angle gauge of this invention positioned on a fully open caliper.
Figure 2:
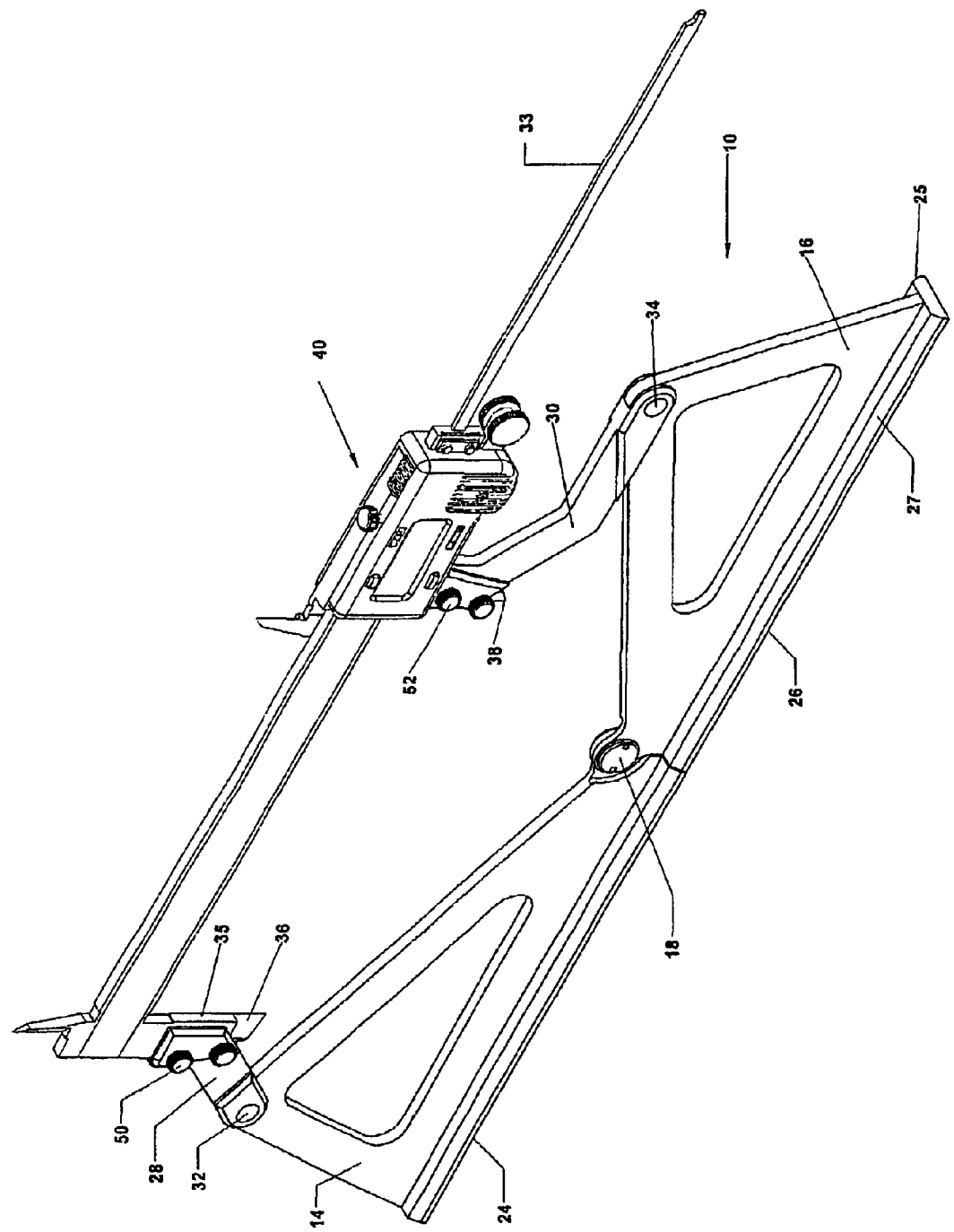
FIG. 2 is a perspective view of the embodiment of FIG. 1.
Figure 3:
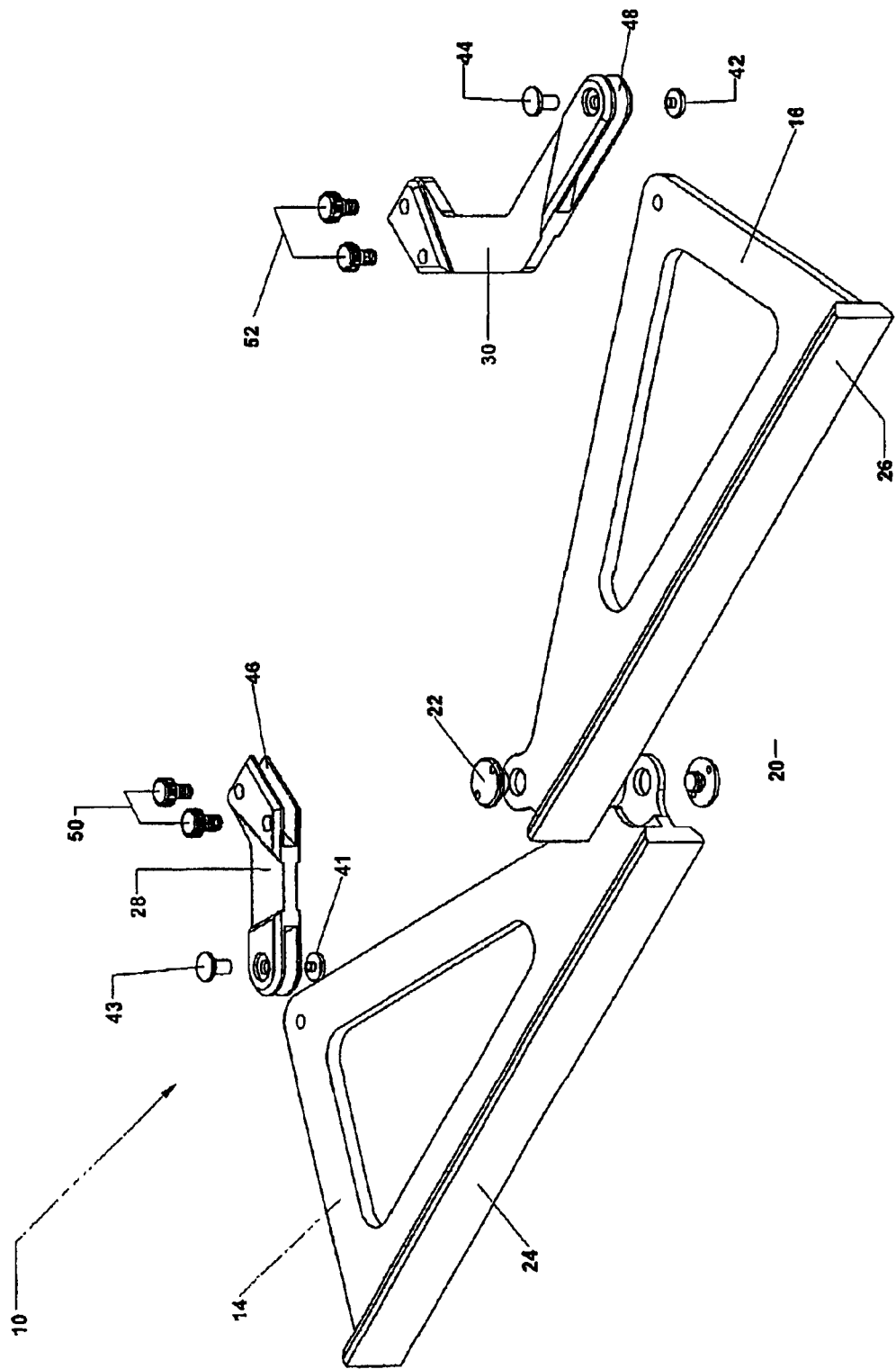
FIG. 3 is an exploded view of the angle gauge shown in FIG. 1.
Figure 4:
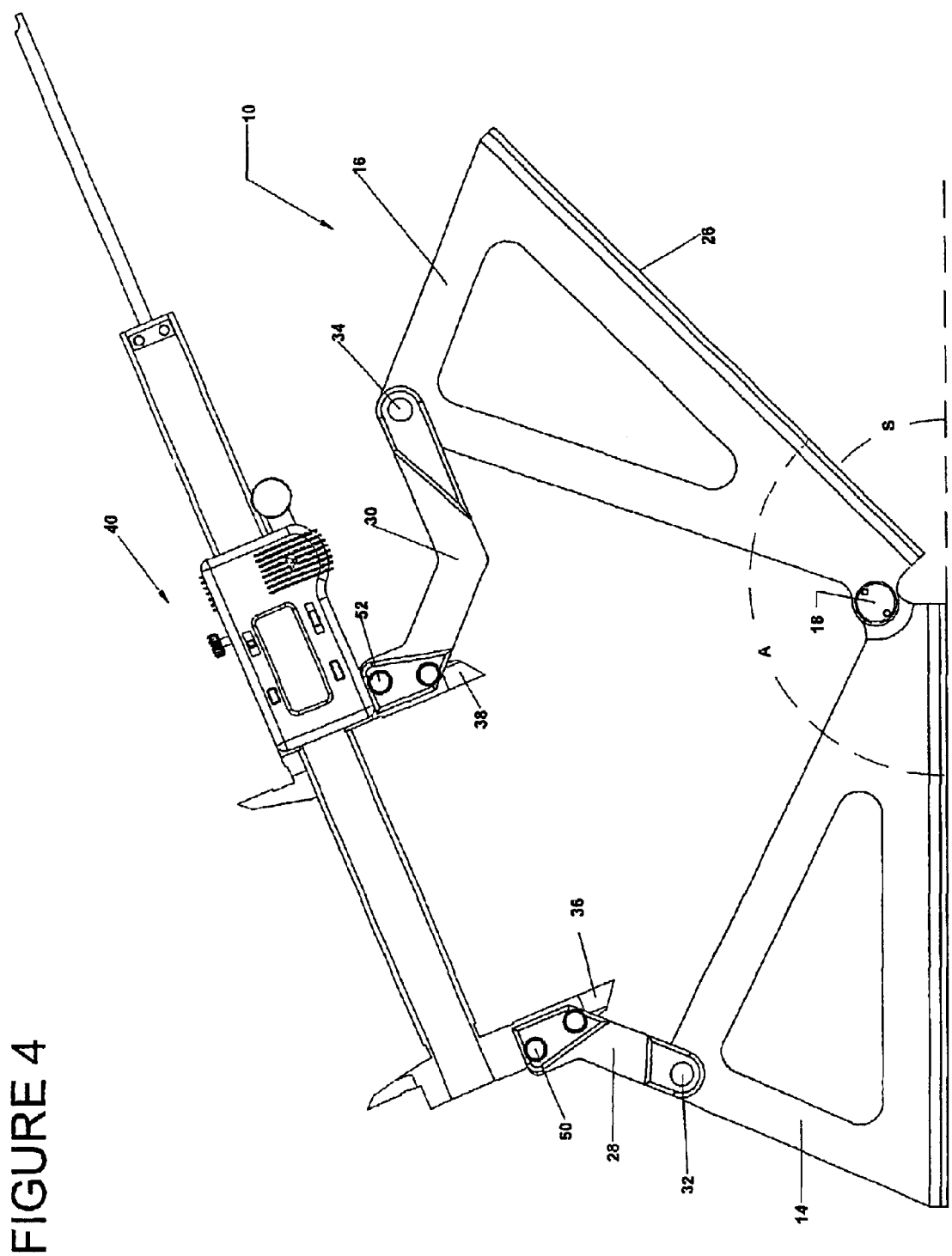
FIG. 4 is a top plan view of the embodiment of FIG. 1 in a second orientation with the caliper partially closed.
Figure 5:
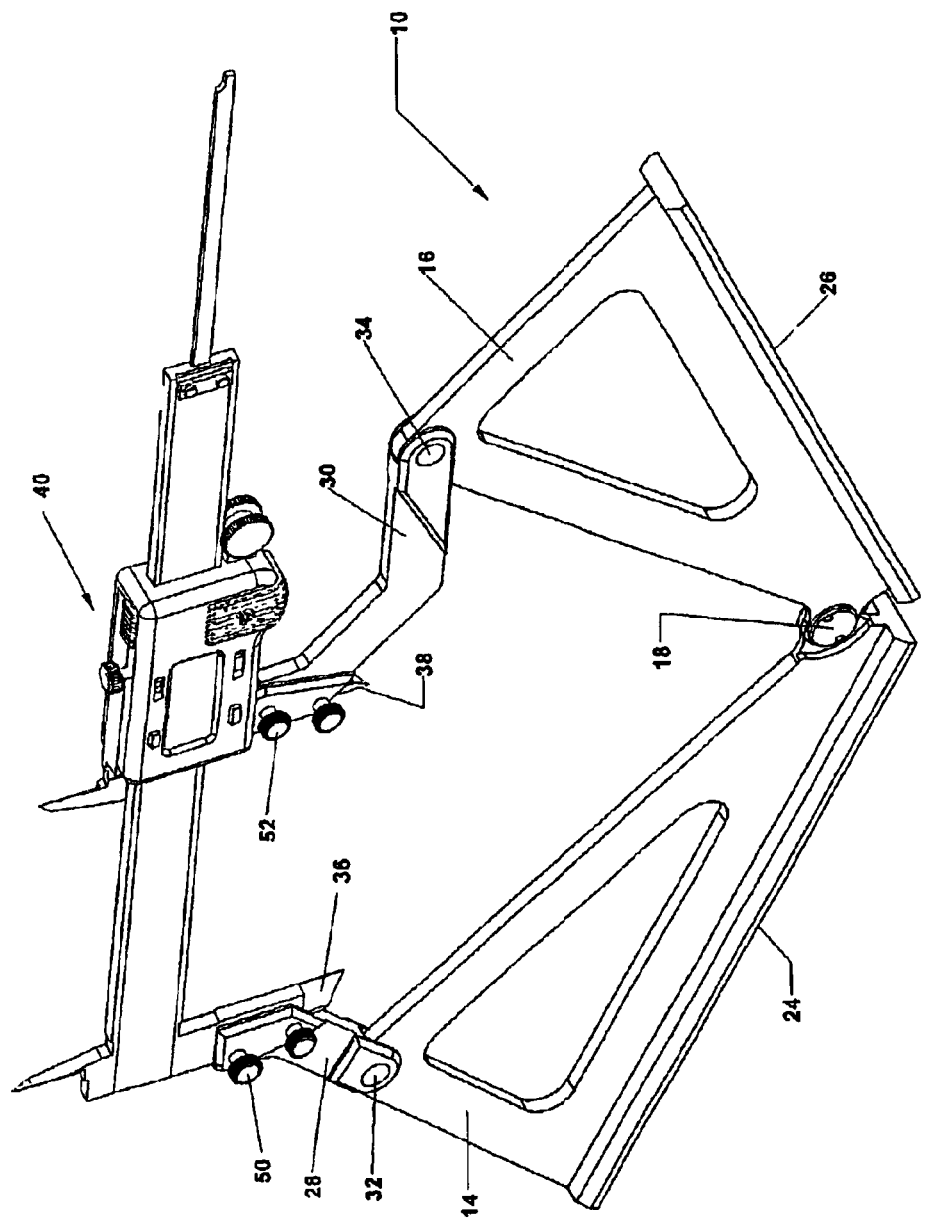
FIG. 5 is a perspective view of the assembly shown in FIG. 4.

FIGS. 1–12 illustrate one embodiment of the angle gauge 10 of this invention positioned on the arms 36, 38 of a digital caliper 40. Angle gauge 10 has two protractor wings 14, 16 pivotably attached at a center pivot 18. A usable pivot structure is illustrated in FIG. 3 where a center pivot 18 having a threaded connector 20 is received in an axle 22, but other suitable pivot arrangements are also usable. Each wing 14, 16 is equipped with at least one reference surface 24, 26. Sloping dovetail surfaces 25 and 27 facilitate easy and accurate attachment of accessories, such as, for example, a sliding "shoe" (not shown) or right angle attachments, as discussed later.

Each wing 14, 16 further has a bracket arm 28, 30 pivotably attached to the wing 14, 16 with a bracket arm pivot 32, 34 for securing the wing 14, 16 to an arm 36, 38 of the caliper 40. FIG. 3 illustrates the bracket arm pivots 32, 34 having a free pivot 41, 42 which is press fitted into a flange 43, 44. However, any center pivot and bracket arm pivot that pivotably connects each wing 14, 16 with its bracket arm 28, 30 may be used, and this invention is in no way limited to those pivoting means illustrated herein.

Each bracket arm 28, 30 also has an attachment means for attaching the device to the caliper arms 36, 38. While numerous attachment structures may be used, FIGS. 1–12 illustrate attachment of the bracket arms 28, 30 to the caliper arms 36, 38 with sleeves 46, 48 and screws 50, 52 threaded into the sleeves 46, 48. A caliper arm 36, 38 fits into the sleeve 46, 48 of a bracket arm 28, 30 and the screws 50, 52 are tightened to bear against and thereby secure the caliper arm 36, 38 in the bracket arm sleeve 46, 48.

The bracket arms 28, 30 are preferably configured so that, when attached to the caliper arms 36, 38, they do not cover or obstruct reference surfaces 35, 37 of the arms 36, 38. For example, in the embodiment of FIGS. 1–12, the bracket arms 28, 30 are offset from the reference surfaces 35, 37. When so positioned on the caliper arms 36, 38, the gauge 10 generally does not interfere with translation of the caliper arms 36, 38 along the caliper 40 or otherwise with use of the caliper 40 as a linear measuring tool for objects that can fit between caliper arms 36 and 38 without also contacting wings 14 or 16 of angle gauge 10. Moreover, the offset bracket arms 28, 30 allow the gauge 10 to be used at any angle without interference by the caliper, particularly the depth gauge stem 33. See FIG. 1.

The gauge 10 may be made from a variety of materials possessing suitable physical properties including structural integrity, including, but not limited to, plastic, steel, and extruded aluminum. Moreover, the different components of the gauge 10 can, but need not, be made from the same materials.

Using gauge 10, an angle may be determined or set by reference to a linear distance as indicated by the caliper 40. Tables 1–3 (portions of which are reproduced in FIGS. 13–15) are provided for use with the gauge 10. The tables are generated using standard trigonometry and indicate the various angles corresponding to a linear distance. While the tables reflect the distances in 0.01 millimeter (mm) increments, smaller or larger increments may be provided depending on the caliper used and the application. Moreover, the English system may be used instead of the metric system. As an alternative or supplement to the table, a digital caliper or other device may be programmed to calculate an angle from the linear distance using appropriate trigonometric functions and display the angular value directly on a readout.

For purposes of illustration only, the angle gauge 10 shown in the figures and described here is shown with a 6" (or 153 mm) digital caliper 40. The gauge 10 may be built for use with a number of different-sized calipers, including 8" (or 203 mm) and 12" (or 305 mm) calipers, and other sizes of calipers and other linear measuring devices. Gauge 10 may also be built as a dedicated angle-measuring gauge with a dedicated linear measuring assembly substituted for caliper 40. Such a dedicated measuring assembly could have a dial, digital or other read-out that displays an angular value either indirectly or directly.

Calibration

Before use, the gauge 10 may be calibrated as follows:

1. Position the reference surfaces 24, 26 against a flat surface so the reference surfaces 24, 26 form a 180° angle (see FIGS. 1–2).

2. Open the caliper arms 36, 38 until the caliper 40 reads precisely six inches (or 153 mm) (or in some cases where the caliper setting can be set to "zero" as in digital calipers the caliper may be fully extended to whatever the caliper's fully open measurement is) and lock the caliper arms 36, 38 in place.

3. Attach each bracket arm 28, 30 to the appropriate caliper arm 36, 38 while the reference surfaces 24, 26 remain flat on the underlying surface.

4. Unlock the caliper arms 36, 38.

Once the caliper arms 36, 38 are unlocked, the gauge 10 may be used to set and measure angles. In the first embodiment, shown in FIGS. 1–8, the gauge 10 is capable of measuring angles between 90°–180°. For each linear distance, two corresponding angles are provided in Table 1, primary angle A and supplementary angle S. Primary angle A represents the angle formed by the reference surfaces 24, 26, and supplementary angle S represents the supplementary angle of the primary angle A (i.e. 180°–A).

Figure 6:
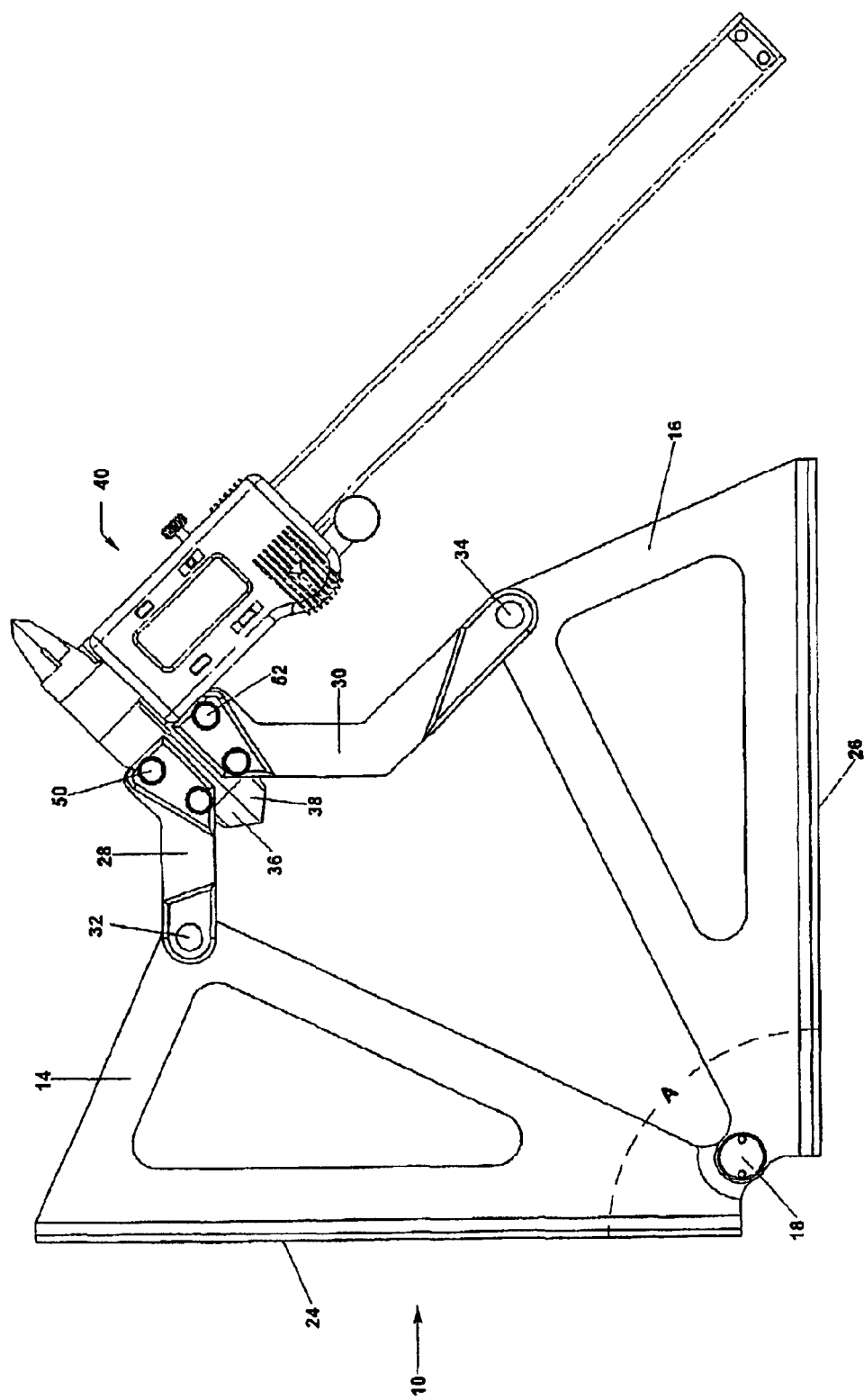
FIG. 6 is a top plan view of the embodiment of FIG. 1 with the caliper fully closed.
Figure 7:
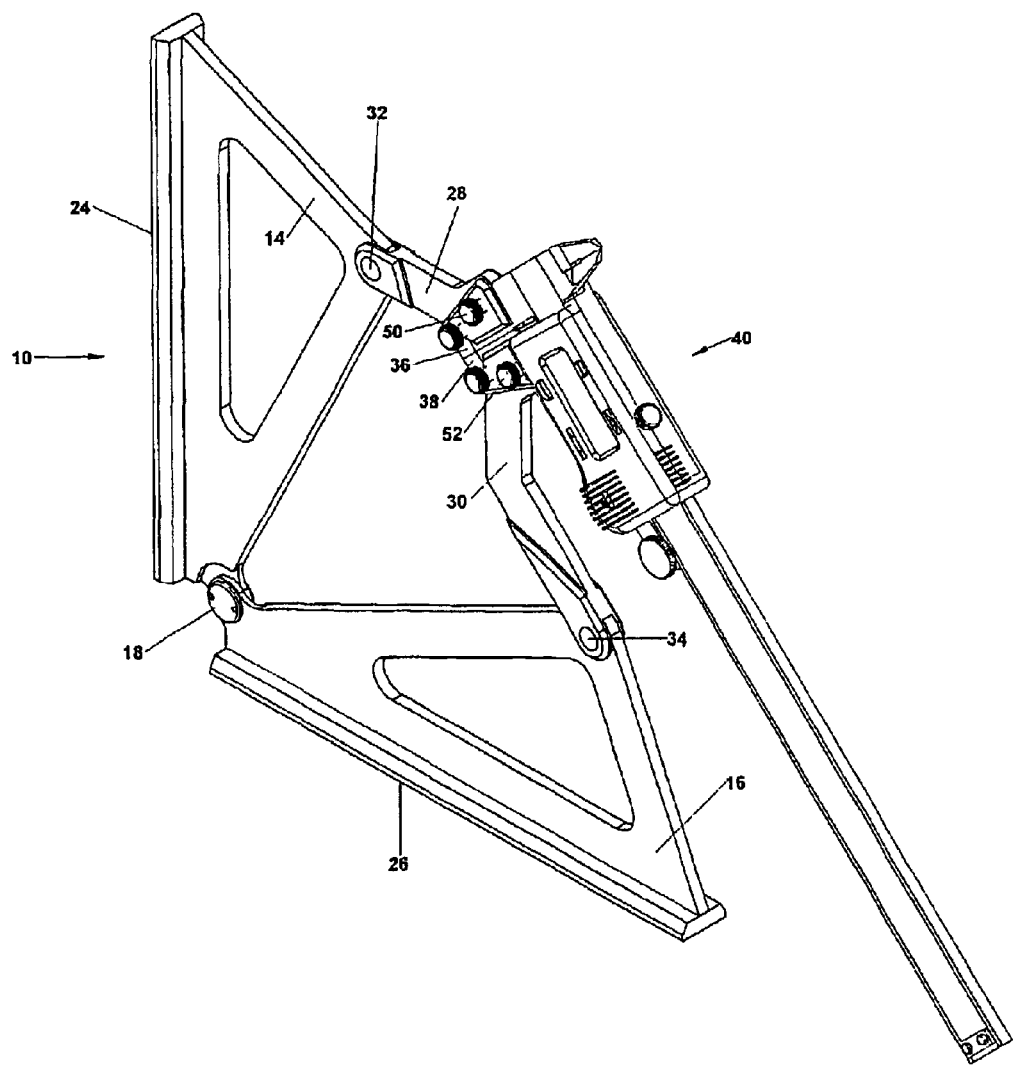
FIG. 7 is a perspective view of the assembly of FIG. 6.
Figure 8:
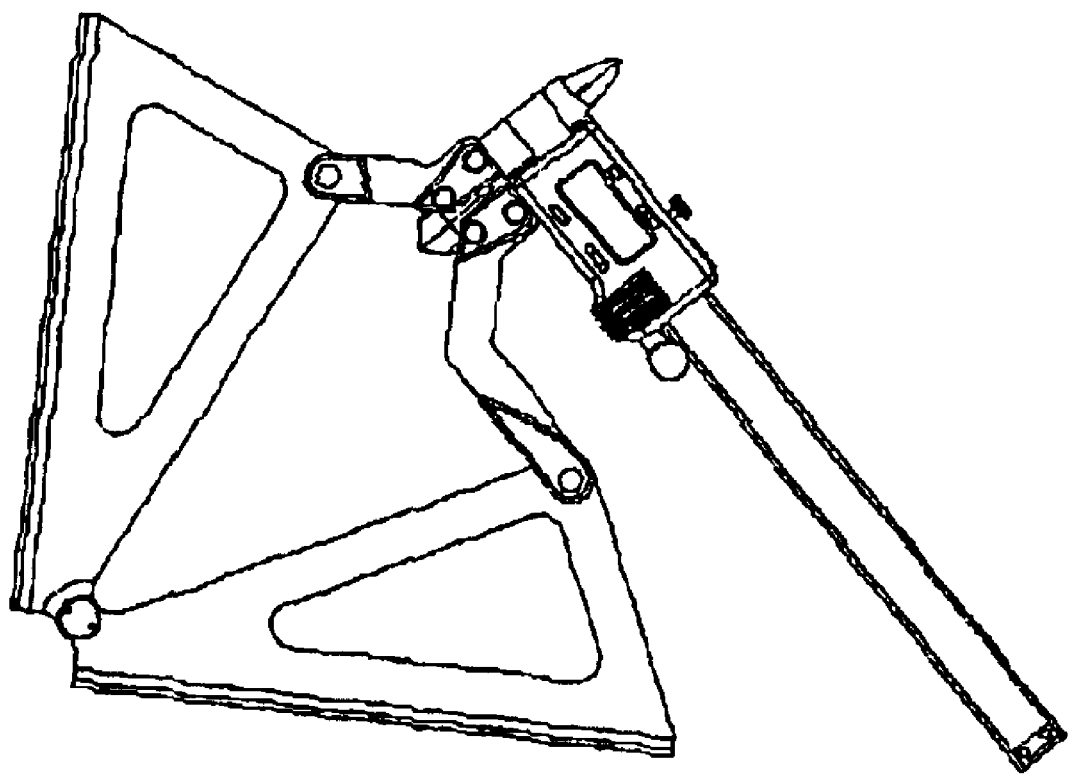
FIG. 8 illustrates the embodiment of FIGS. 1–7 in use.

When the caliper arms 36, 38 are in their fully open position as shown in FIGS. 1 and 2 (i.e. D equals 6"), the reference surfaces 24, 26 form a primary angle A of 180° and a supplementary angle S of 0°. When the caliper arms 36, 38 are in their fully closed position as shown in FIGS. 6 and 7 (i.e. D equals 0"), the reference surfaces 24, 26 form a primary angle A of 90° and a supplementary angle S of 90°. Therefore, there are 90 degrees of angular measuring capacity in this embodiment of the gauge 10. However, in an alternative embodiment, the gauge 10 may be designed so the wings 14, 16 may extend past the center pivot 18 for measuring angles greater than 180°, or the total range of motion may be restricted to a total of 45 degrees effectively doubling the number of angle settings available.

Setting an Angle

To set an angle between 90°–180°, the user simply locates the desired angle (either A or S) on Table 1, reads the corresponding distance D, and sets and locks the caliper arms 36, 38 at the distance D. For example, assume a table saw blade must be positioned 135° relative to the table surface. The user simply refers to the chart to find the distance D that corresponds to a 135° primary angle A and positions and locks the caliper arms 36, 38 at that distance D (see FIGS. 4 and 5). When the user positions one reference surface 24 flush with the table, the other reference surface 26 will be set 135° relative to the table surface (see FIG. 8). Thus, the user simply aligns the saw blade with reference surface 26 to ensure the blade is at a 135° angle relative to the table surface. Alternatively, the 135° angle may be set using the supplementary angle S of 45°.

Measuring an Angle

Similarly, to determine an angle between two workpiece or machine surfaces, the user positions the reference surfaces 24, 26 of the gauge 10 against the workpiece surfaces, reads the distance D off of the caliper 40, and locates the corresponding angles A and S on Table 1 (assuming the caliper 40 does not directly display the angle measurement). For example, to determine the angle between a table saw blade and the table, the user positions one reference surface 24 against the table and the other reference surface 26 against the saw blade (see FIG. 8). The user then reads the distance D from the caliper 40 and consults Table 1 to identify the angle A and S that correspond to distance D.

Figure 9:
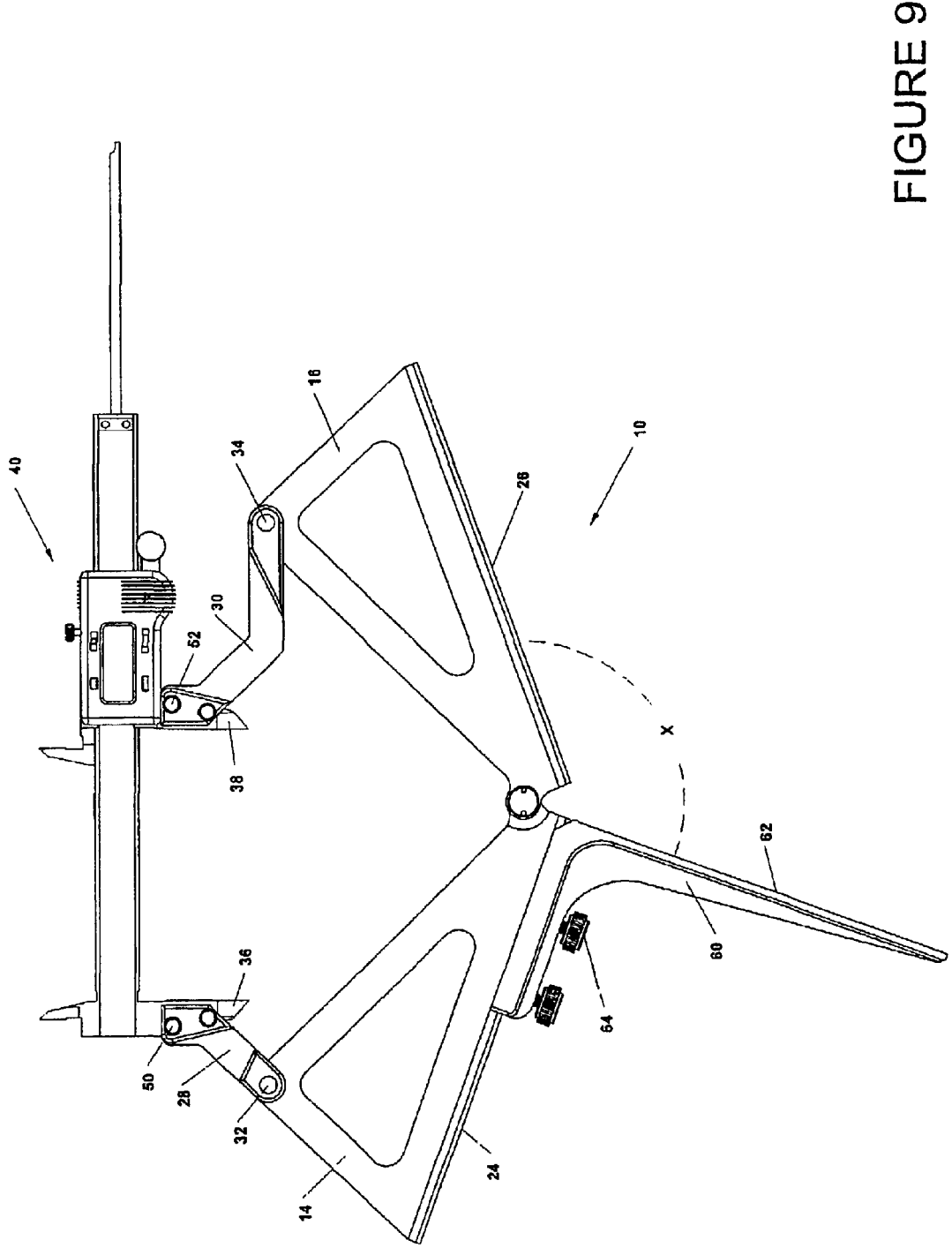
FIG. 9 is a top plan view of the embodiment of FIG. 1 with a right angle attachment.
Figure 10:
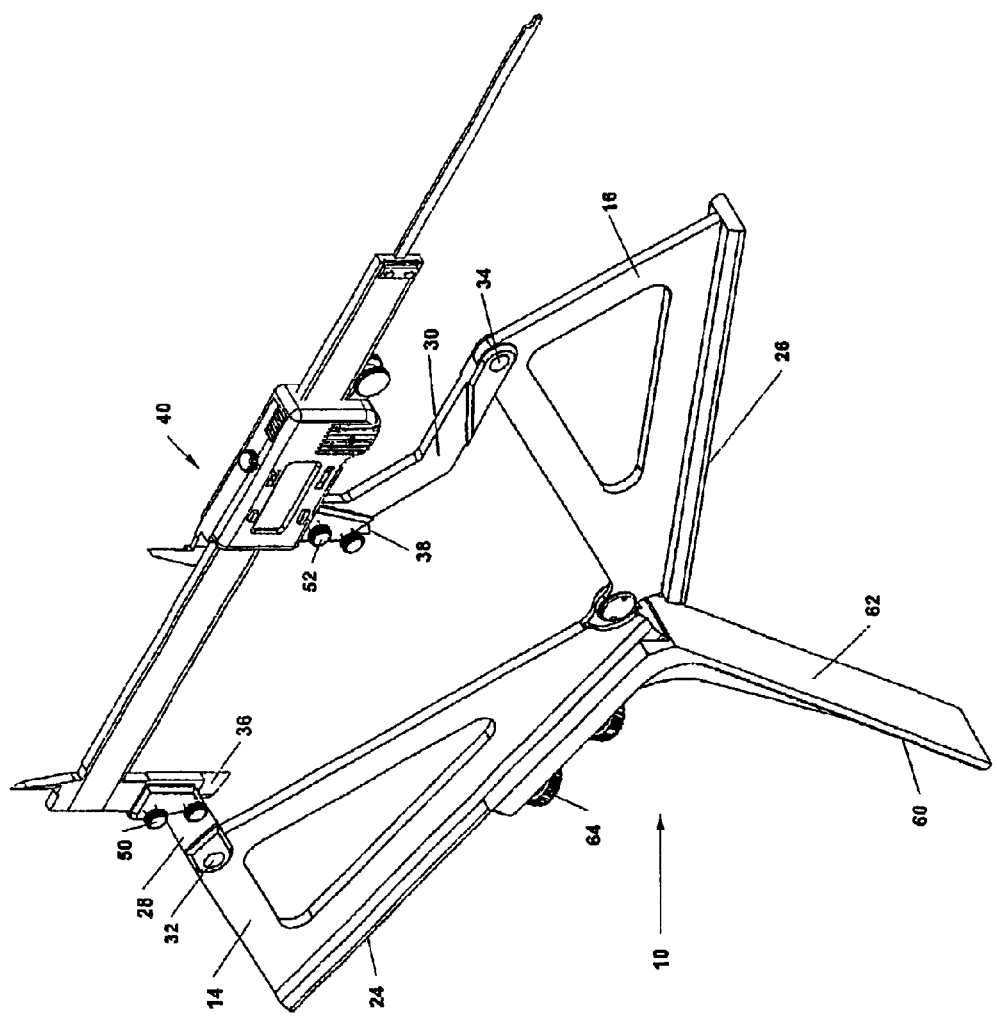
FIG. 10 is a perspective view of the embodiment of FIG. 9.
Figure 11:
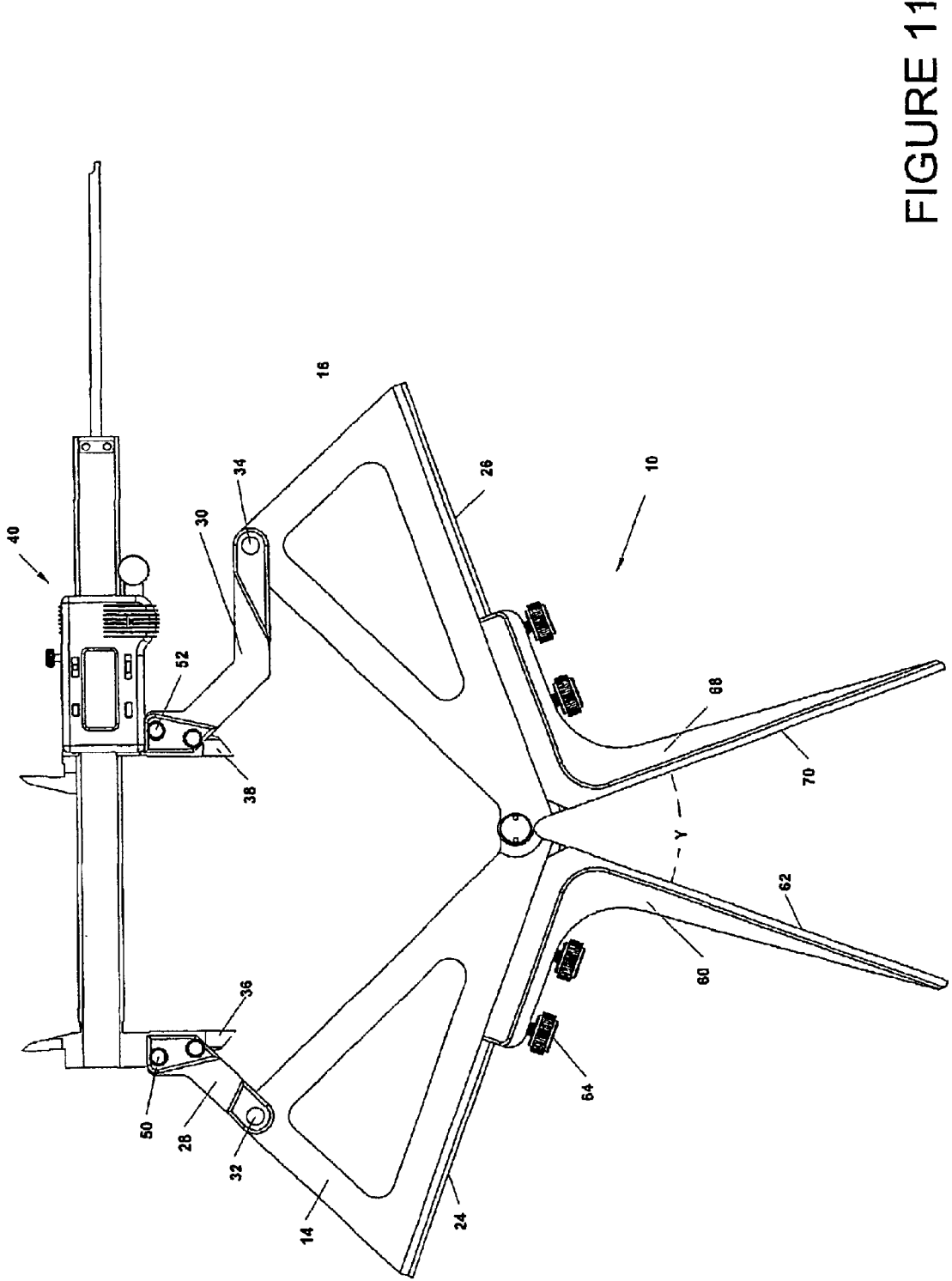
FIG. 11 is a top plan view of the embodiment of FIG. 1 with two right angle attachments.
Figure 12:
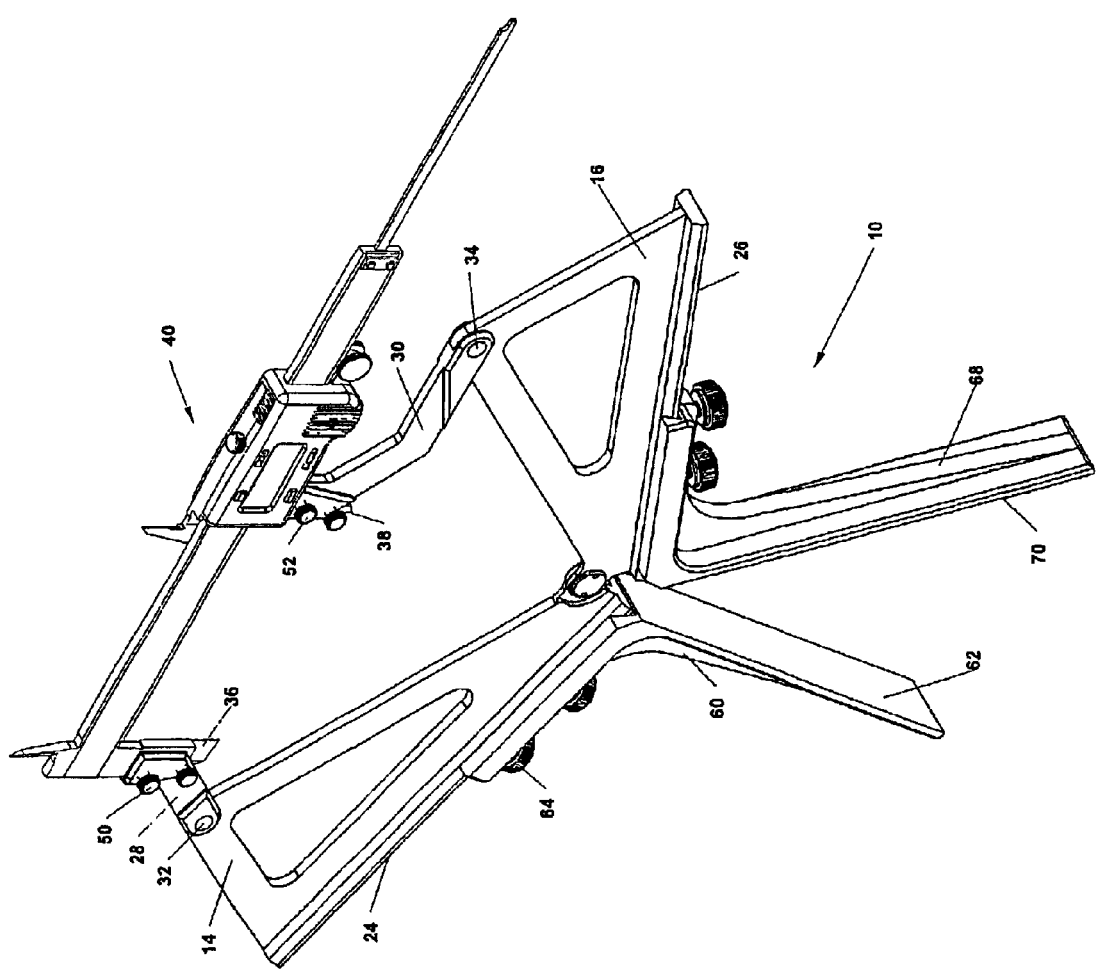
FIG. 12 is a perspective view of the embodiment of FIG. 11.
Figure 16:
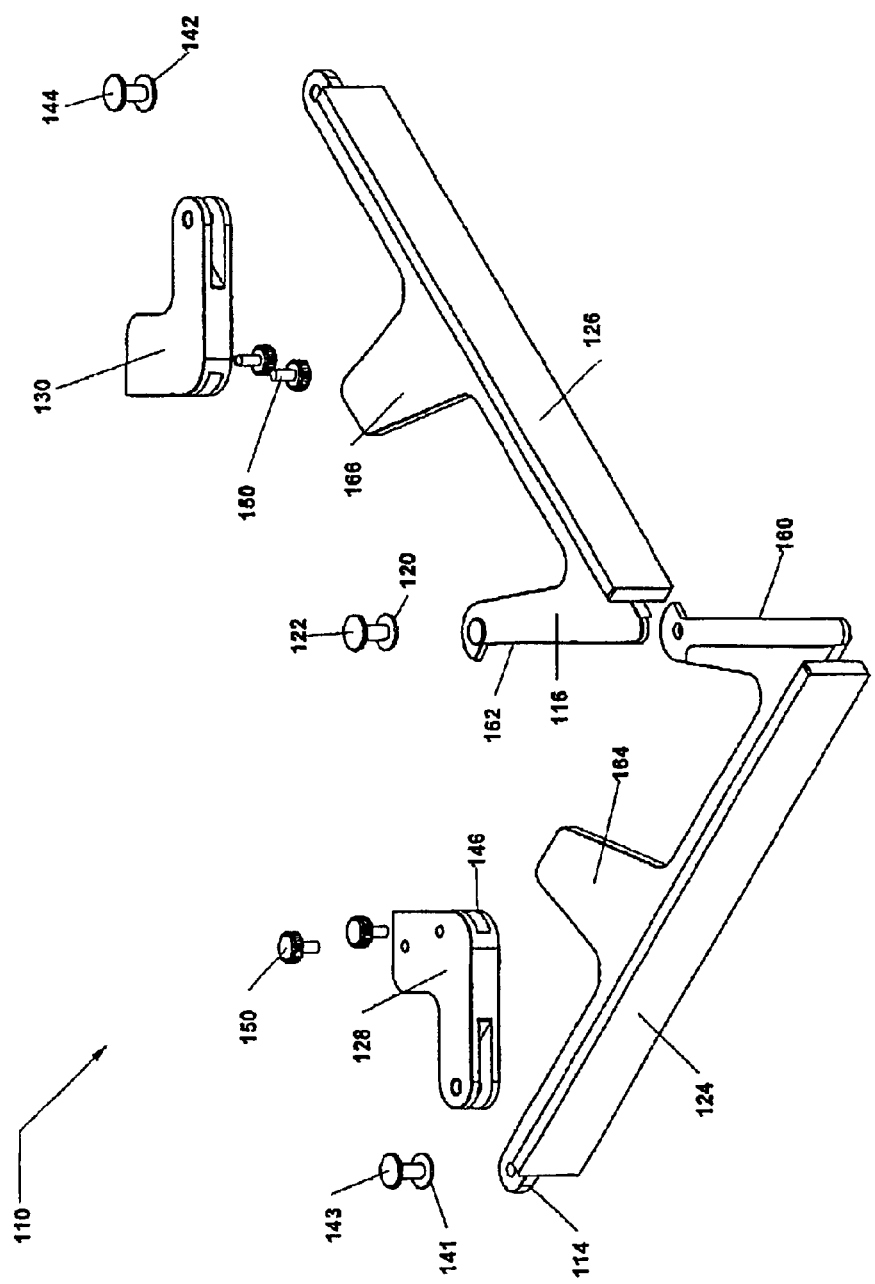
FIG. 16 is an exploded view of an alternative embodiment of the device of the present invention.

The angle gauge 10 embodiment of FIGS. 1–8 is limited to setting and measuring angles between 90° and 180°, inclusive. To expand the measuring capabilities beyond a 90 degree range, a right angle attachment 60 may be added to the gauge 10, as shown in FIGS. 9 and 10. The right angle attachment 60 has an attachment reference surface 62 and is positioned along and secured to one of the wing reference surfaces 24, 26. While any positioning and securing means may be used, FIGS. 9 and 10 illustrate a dovetail recess in the foot 61 of attachment 60 so the attachment 60 is simply slid onto the reference surface 24 structure of wing 14. The attachment 60 may be secured in place along the wing reference surface 24 with, for example, threaded screws 64 that pass through foot 61 and bear against surface 24. The attachment 60 allows the user to measure and set obtuse angles by using the angle X (shown in FIG. 9) formed between the attachment reference surface 62 and the wing reference surface 26 not mounted with the attachment 60. The methods for setting and determining angles are identical to those described above. FIG. 14 reproduces a portion of Table 2 that can be referenced to determine corresponding linear and angular measurements when using a single right angle attachment 60 with the angle gauge 10.

To measure acute angles more easily, a second right angle attachment 68 having a reference surface 70 is mounted on the second wing 26 in a similar manner as the first right angle attachment 60. An acute angle Y (see FIG. 11) between the reference surfaces 62, 70 of the first and second attachments 60, 68, respectively, can be set or measured by reference to Table 3 of FIG. 15, which reproduces corresponding linear and angular measurements when using two right angle attachments 60, 68 with the gauge 10.

Figure 17:
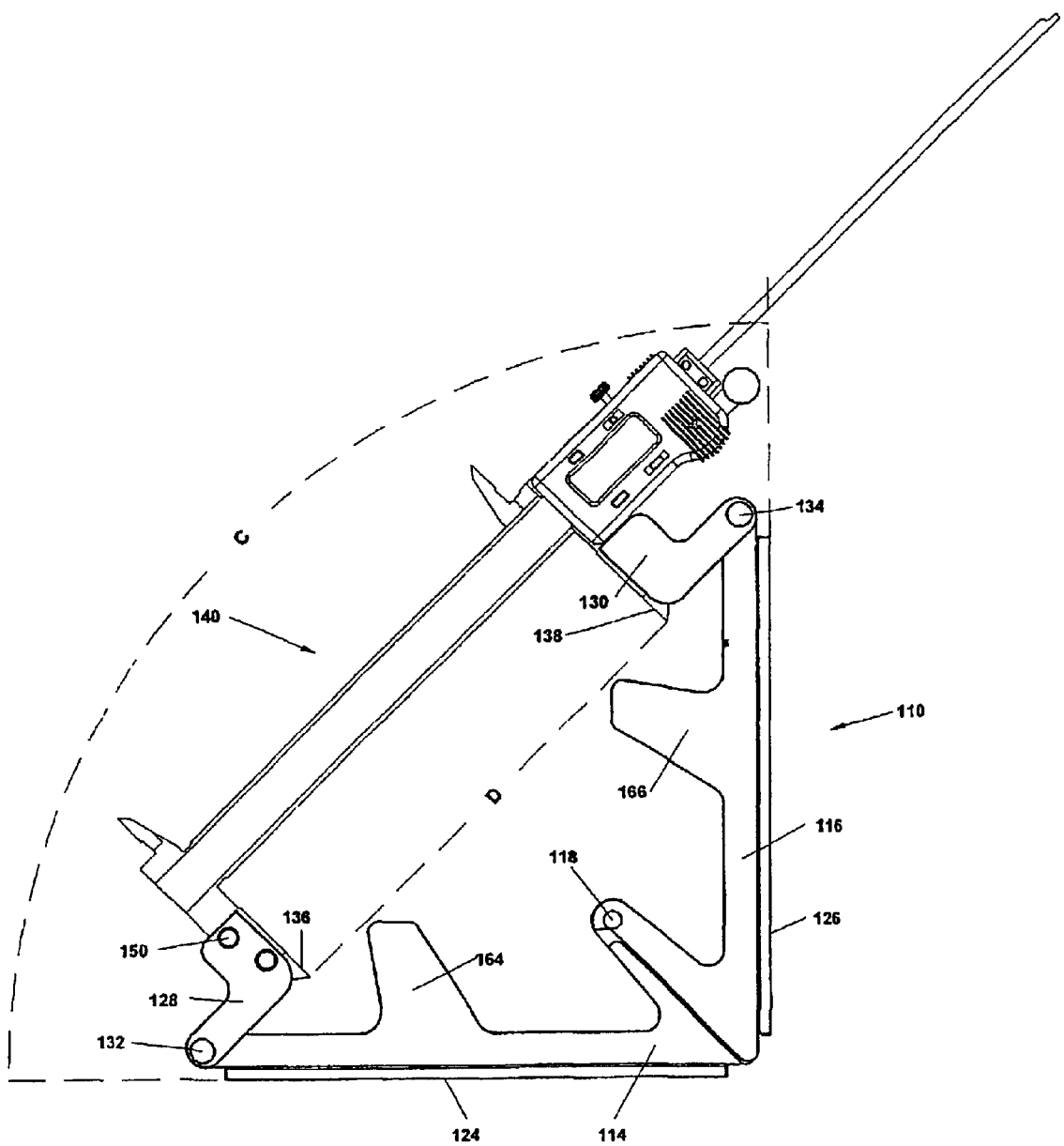
FIG. 17 is a top plan view of the embodiment of FIG. 16 positioned on a fully open caliper.
Figure 18:
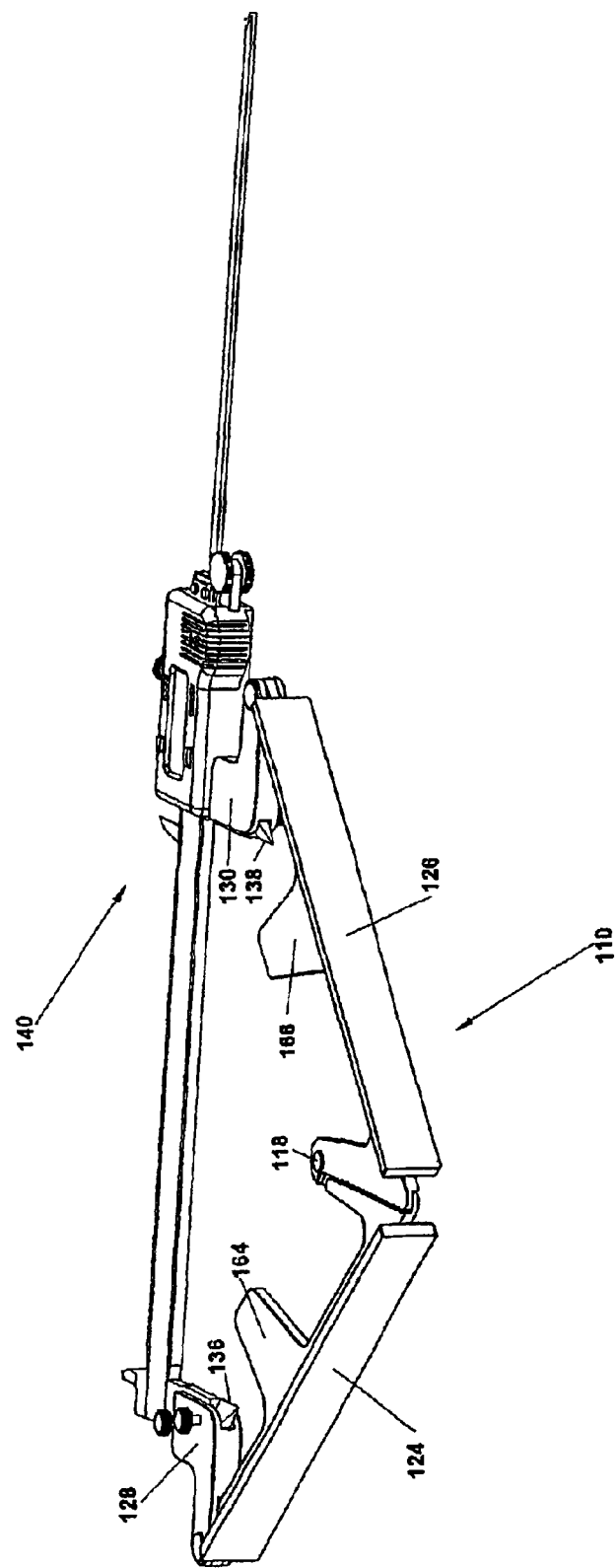
FIG. 18 is perspective view of the embodiment of FIG. 17.
Figure 19:
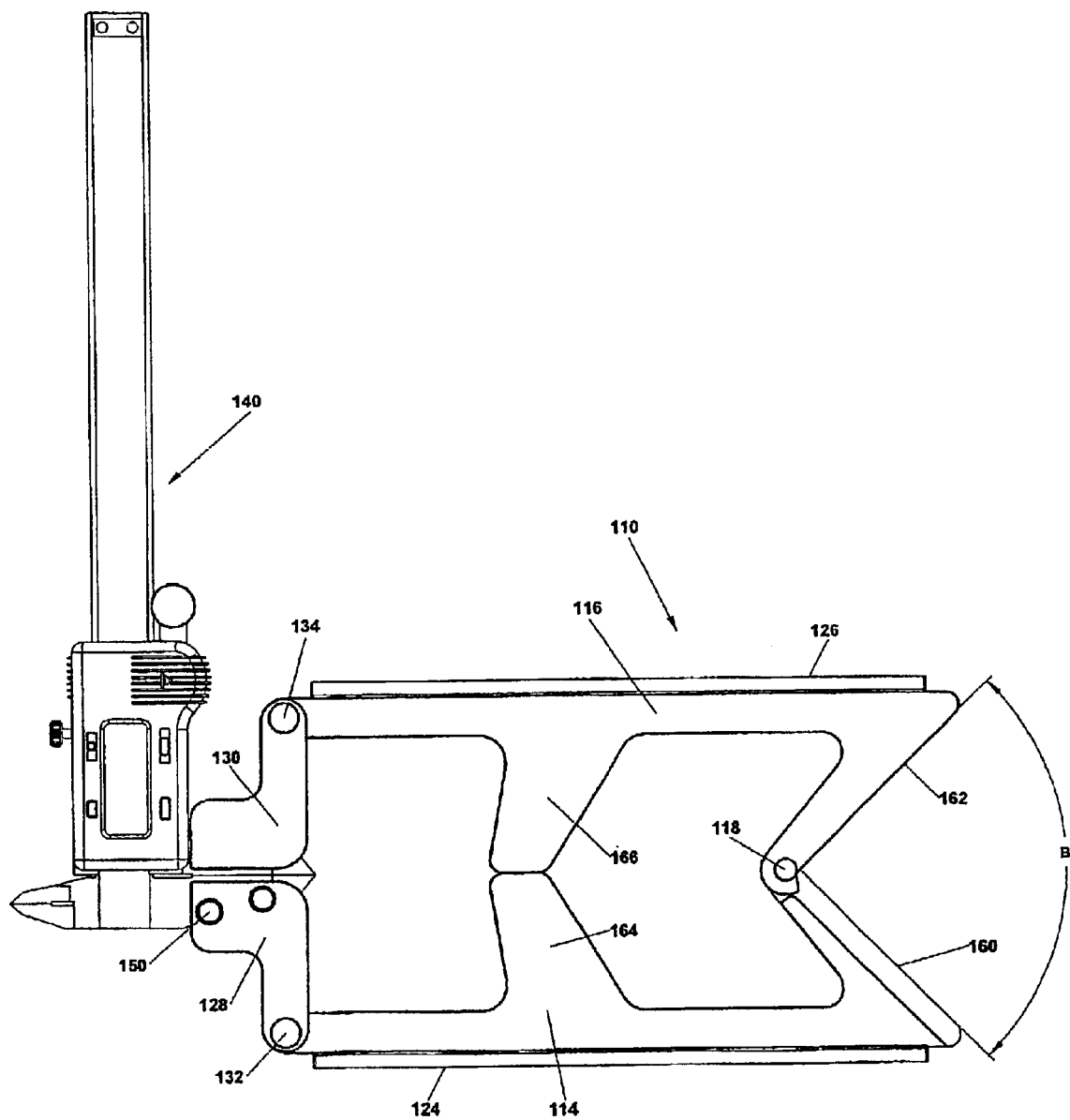
FIG. 19 is a top plan view of the embodiment of FIG. 16 in a second orientation shown as it would be positioned on a fully-closed caliper.
Figure 20:
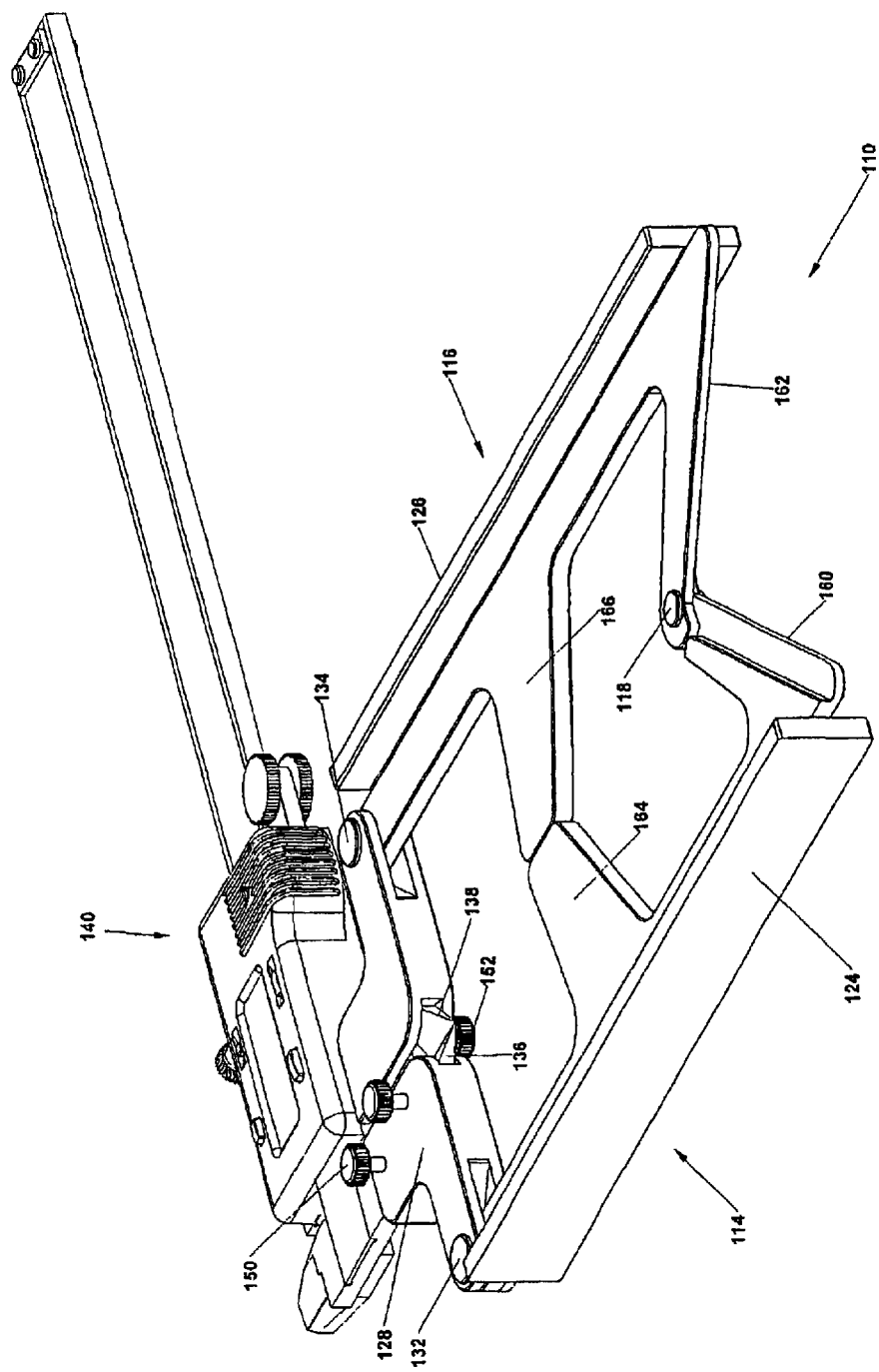
FIG. 20 is a perspective view of the embodiment of FIG. 19 shown on a closed caliper.
Figure 21:
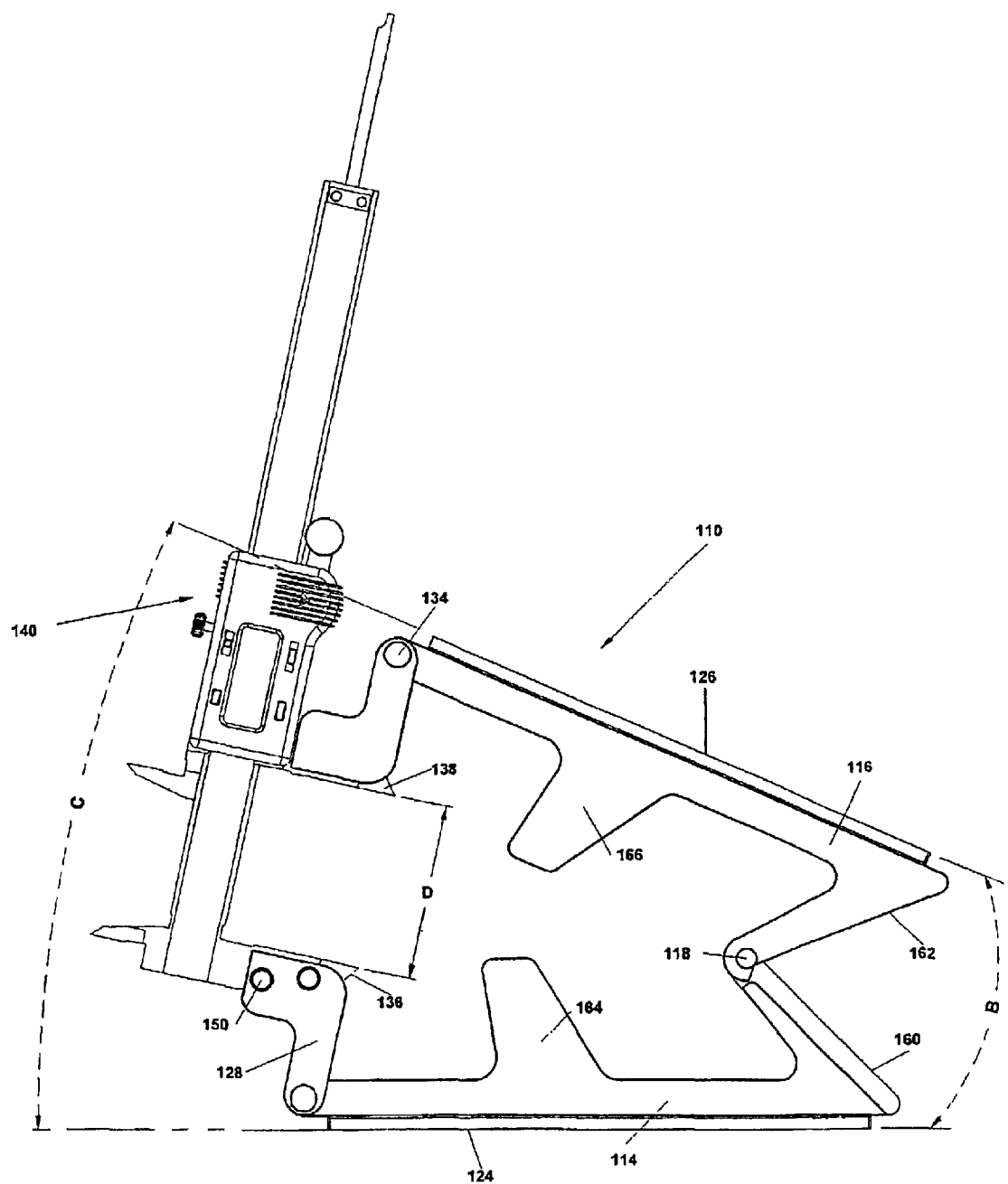
FIG. 21 is a top plan view of the embodiment of FIG. 16 in a third orientation with a partially open caliper.
Figure 22:
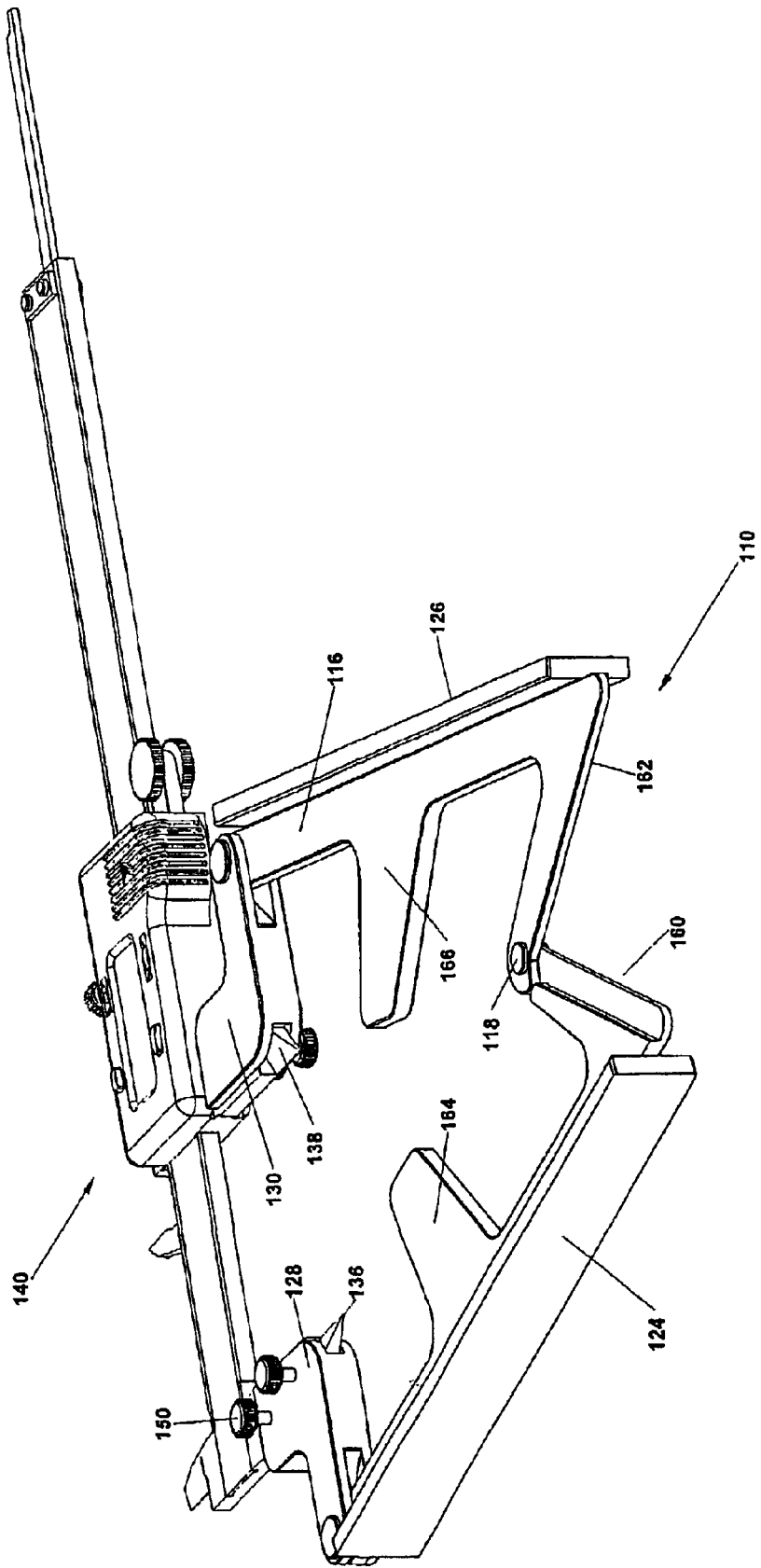
FIG. 22 is a perspective view of the embodiment of FIG. 21.
Figure 23:
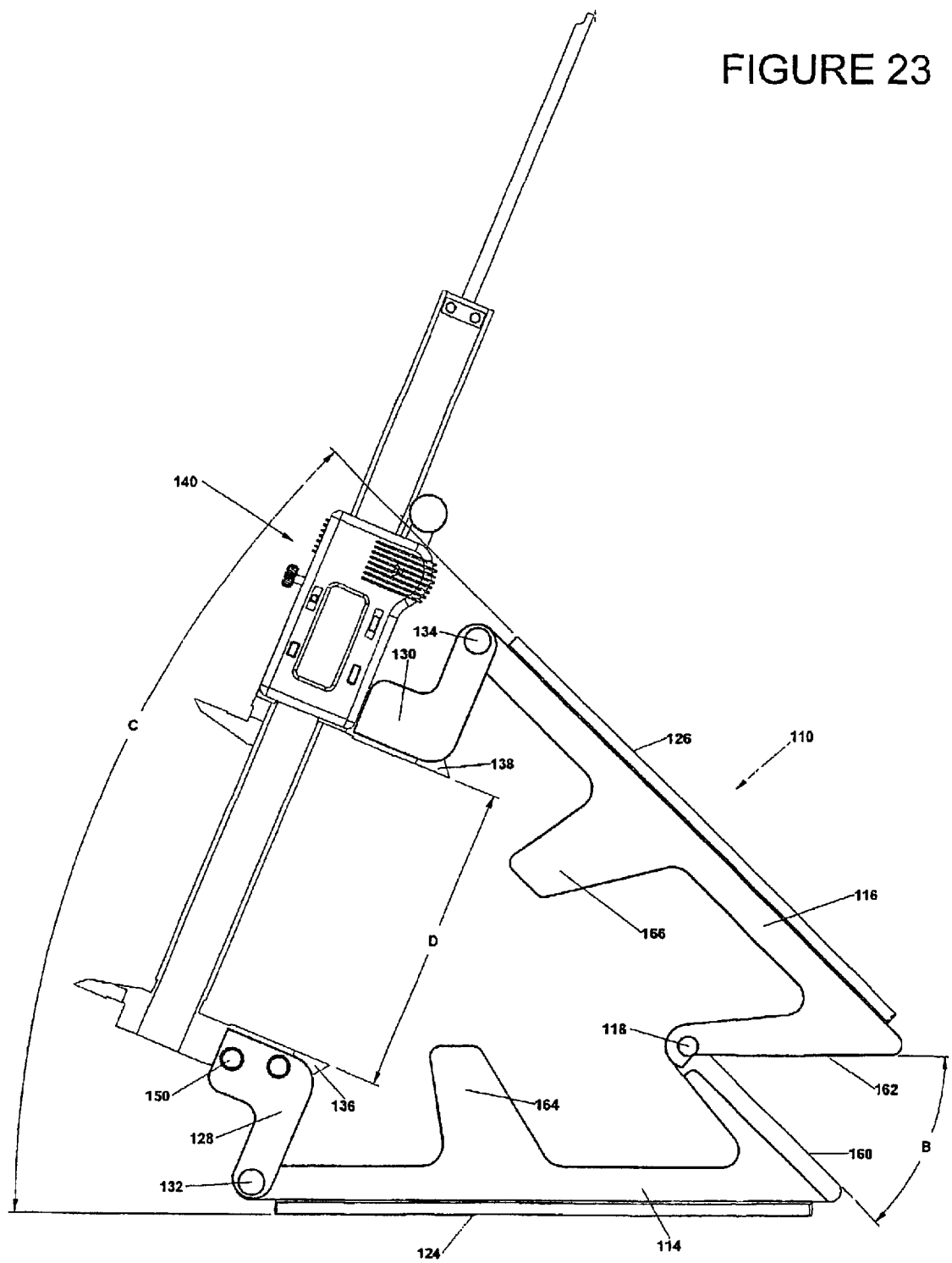
FIG. 23 is a top plan view of the embodiment of FIG. 16 in a fourth orientation.
Figure 24:
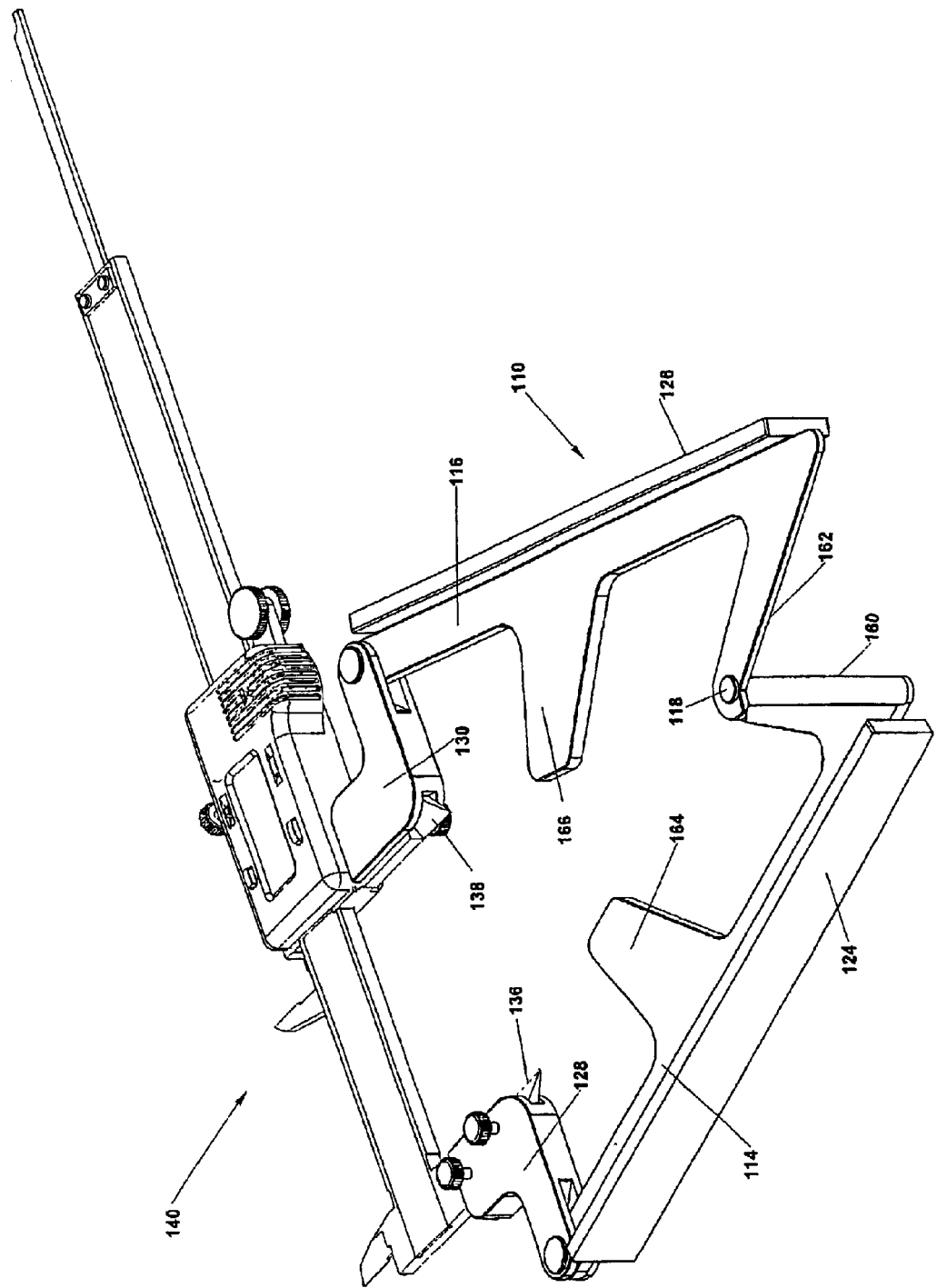
FIG. 24 is a perspective view of the embodiment of FIG. 23.

FIGS. 16–24 show an alternative embodiment of the gauge 110 of this invention. Each wing 114, 116 includes two reference surfaces—a primary reference surface 124, 126 and a secondary reference surface 160, 162. As shown in FIGS. 19 and 21, when the wings 114, 116 are pivotally connected together, the secondary reference surfaces 160, 162 intersect to form a small protractor angle B, and the primary reference surfaces 124, 126 form a large protractor angle C, which is the complementary angle of the small protractor angle B. Each wing 114, 116 may additionally be equipped with protuberances 164 and 166 that touch when gauge 110 is fully open (and caliper 140 is fully closed).

Gauge 110 may be attached to a dial or digital caliper 140 in the same manner as gauge 10. When the caliper arms 136, 138 are in their fully open position as shown in FIGS. 17–18 (i.e. D equals 6"), the secondary reference surfaces 160, 162 are parallel and therefore form an angle B of 0°, and the primary reference surfaces 124, 126 form an angle C of 90°. When the caliper arms 136, 138 are in their fully closed position as shown in FIGS. 19–20 (i.e. D equals 0"), the secondary reference surfaces 160, 162 form an angle B of 90°, and the primary reference surfaces 124, 126 are parallel and therefore form an angle C of 0°. When so positioned, protuberances 164, 166 contact to prevent the wings 114, 116 from over-closing so that B is greater than 90°. However, in alternative embodiments, the wings 114, 116 may be formed to allow for the primary 124, 126 and secondary reference surfaces 160, 162 to form angles greater than 90°. Moreover, the wings 114, 116 may also be formed to further restrict the angular measuring capacity of the gauge 110 by, for example, preventing the maximum value of angle B or C from exceeding 45°.

FIGS. 21–22 and 23–24 illustrate the protractor positioned to form an angle B of 45° and 66°, respectively, and an angle C of 45° and 24°, respectively.

Gauge 110 is used in a manner similar to gauge 10. Gauge 110 is attached to the caliper arms 136, 138, and the caliper arms 136, 138 translate along the caliper 140 to vary angles B and C. Table 4 (see FIG. 25), similar to Tables 1–3, indicates the various angles B and C corresponding to a linear distance between the caliper arms 136, 138. As an alternative or supplement to the table, a digital caliper or other device may be programmed to calculate an angle from the linear distance and display the angular value directly to the user.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims. For instance, as is illustrated by comparing gauge embodiments 10 and 110, the principles of this invention may be practiced in different gauge configurations. Attachment to a caliper is also not required; the caliper could simply be used to measure the distance between a reference pin, surface or other structure on each of the gauge arms with the gauge set at an unknown angle. Likewise, other gauge attachment structures could be used, as could other pivot structures than those illustrated in the drawings and described above. Gauge components can be molded, cast, extruded, machined or otherwise fabricated or formed of polymeric, metal, composite or other materials.

I claim:

1. An angle gauge comprising:

a. a first reference surface pivotably attached to a second reference surface;

b. a first bracket arm pivotably attached to the first reference surface and for attachment to a caliper first arm; and c. a second bracket arm pivotally attached to the second reference surface and for attachment to a caliper second arm.

2. The gauge of claim 1, further comprising at least one screw threaded into each bracket arm for attaching each bracket arm to a corresponding caliper arm.

3. The gauge of claim 1, further comprising a right angle attachment for attachment to one of the reference surfaces to provide a right angle reference surface positioned at a right angle to the reference surface to which it is attached.

4. A measuring system comprising:

a linear measuring device having first and second arms movable to a plurality of linear distances from one another;

an angle gauge comprising a first wing having a first wing reference surface and a second wing having a second wing reference surface;

the first and second wings being pivotally mounted with respect to one another for movement from a first angle position wherein the first and second wing reference surfaces are disposed at a first angle relative to one another to a second angle position wherein the first and second wing reference surfaces are disposed at a second angle with respect to one another;

the first and second wings being coupled to the first and second arms of the linear measuring device, respectively and causing the first and second anus to move to a first linear distance apart from one another when the first and second wings move to the first angle position, the first and second wings causing the first and second arms to move a second linear distance apart from one another when the first and second wings move to the second angle position.

5. The measuring system of claim 4, wherein the linear measuring device is a caliper.

6. The measuring system of claim 4, wherein the angle gauge further comprises a first attachment having a first attachment reference surface, wherein the first attachment is positioned on the first wing and the first attachment reference surface and the second wing reference surface form a second angle.

7. The measuring system of claim 6, wherein the first attachment is positioned on the first wing at least partially by a dovetail connection.

8. The measuring system of claim 6, wherein the angle gauge further comprises a second attachment having a second attachment reference surface, wherein the second attachment is positioned on the second wing and the first attachment reference surface and the second attachment reference surface form a third angle.

9. The measuring system of claim 8, wherein the second attachment is positioned on the second wing at least partially by a dovetail connection.

10. The measuring system of claim 4, further comprising a coupling means, wherein the coupling means couples the measuring device.

11. The measuring system of claim 10, wherein the coupling means comprises at least a first bracket arm and a second bracket arm, wherein the first bracket arm is connected to the first wing and the second bracket arm is connected to the second wing.

12. The measuring system of claim 11, wherein the first bracket arm is pivotably connected to the first wing and the second bracket arm is pivotably connected to the second wing.

13. The measuring system of claim 4, wherein the conversion means comprises a converting device programmed to convert the linear distance into the corresponding angular measurement.

14. The measuring system of claim 13, wherein the converting device is the linear measuring device.

15. The measuring system of claim 14, wherein the converting device is a digital caliper.

16. The measuring system of claim 15, wherein the caliper is a digital caliper having a display screen.

17. The measuring system of claim 16, wherein the conversion means comprises the digital caliper programmed to convert the linear distance into the corresponding angular measurement and to display the corresponding angular measurement on the display screen.

18. The measuring system of claim 4 and further comprising a conversion look up chart for correlating the first linear distance with an angle measurement of the first angle and for correlating the second linear distance with an angle measurement of the second angle.

19. A method for setting a desired angle comprising:

providing an angle gauge comprising a first reference surface movably mounted to a second reference surface for movement to a plurality of angles with respect to one another;

providing a caliper having a first caliper arm connected to the first reference surface of the angle gauge and having a second caliper arm coupled to the second reference surface, the first and second caliper arms being movable to a plurality of linear distances from one another in response to movement of the first and second reference surfaces to the plurality of angles;

determining the desired linear distance between the first caliper arm and the second caliper arm that corresponds to the desired angle between the first and second reference surfaces of the angle gauge;

moving the first reference surface and the second reference surface relative to one another to cause the first caliper arm and the second caliper arm to move to the desired linear distance between one another, whereby the first and second reference surfaces will be disposed at the desired angle between one another.

20. A method for measuring a work piece angle between first and second work piece surfaces comprising:

providing an angle gauge comprising a first reference surface movably mounted to a second reference surface for movement to a plurality of angles with respect to one another;

providing a caliper having a first caliper arm connected to the first reference surface of the angle gauge and having a second caliper arm coupled to the second reference surface of the angle gauge, the first and second caliper anus being movable to a plurality of linear distances from one another in response to movement of the first and second reference surfaces to the plurality of angles;

placing the first reference surface parallel to the first work piece surface;

placing the second reference surface parallel to the second work piece surface whereby the first and second reference surfaces will be disposed relative to one another at a measured angle equal to the work piece angle;

determining the distance between the first and second caliper arms while the first and second reference surfaces are at the measured angle;

converting the linear distance between the first and second caliper arms into the value of the desired angle.

* * * * *